United States Patent
Stadie et al.

(10) Patent No.: US 11,635,769 B2
(45) Date of Patent: Apr. 25, 2023

(54) METHODS, SYSTEMS AND APPARATUS FOR CONTROLLING MOVEMENT OF TRANSPORTING DEVICES

(71) Applicant: OCADO INNOVATION LIMITED, Hatfield (GB)

(72) Inventors: Robert Stadie, Hatfield (GB); Matthew Whelan, Hatfield (GB); Christopher Brett, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 27 days.

(21) Appl. No.: 17/357,121

(22) Filed: Jun. 24, 2021

(65) Prior Publication Data
US 2022/0155797 A1    May 19, 2022

Related U.S. Application Data

(60) Continuation of application No. 17/149,426, filed on Jan. 14, 2021, now Pat. No. 11,079,770, which is a
(Continued)

(30) Foreign Application Priority Data

Jun. 3, 2014  (GB) ...................................... 1409883

(51) Int. Cl.
*G05D 1/02*    (2020.01)
*B65G 1/04*    (2006.01)
(Continued)

(52) U.S. Cl.
CPC ............ *G05D 1/0289* (2013.01); *B60L 58/12* (2019.02); *B65G 1/0464* (2013.01);
(Continued)

(58) Field of Classification Search
CPC .. G05D 1/0289; G05D 1/0255; G05D 1/0297; G05D 2201/0216; B60L 58/12;
(Continued)

(56) References Cited

U.S. PATENT DOCUMENTS 2,701,065 A * 2/1955 Bertel ....................... E04H 6/18
                                                  212/327
4,568,233 A   2/1986 Baker et al.
(Continued)

FOREIGN PATENT DOCUMENTS

CA      2831832      10/2012
CN      1099988      1/2003
(Continued)

OTHER PUBLICATIONS

Plaintiff's Opening Claim Construction Brief, *Ocado Innovation Ltd. and Ocado Solutions Ltd.* vs. *Autostore AS and Autostore Systems, Inc.*, Case No. 1:21-cv-00041-JL, dated Aug. 1, 2022, in 69 pages.
(Continued)

*Primary Examiner* — Thomas Randazzo
(74) *Attorney, Agent, or Firm* — Knobbe, Martens, Olson & Bear, LLP

(57) ABSTRACT

A system and method for controlling movement of transporting devices arranged to transport containers, the containers being stored in stacks arranged in a facility. A facility having pathways arranged in a grid-like structure above stacks, the transporting devices being configured to operate on the grid-like structure. A control unit configured to determine at least one task to be performed by at least one transporting device, wherein the at least one task is determined based on at least one of: transporting device battery condition, transporting device damage, transporting device maintenance issues, and transporting device service issues.

23 Claims, 8 Drawing Sheets

Figure 1:
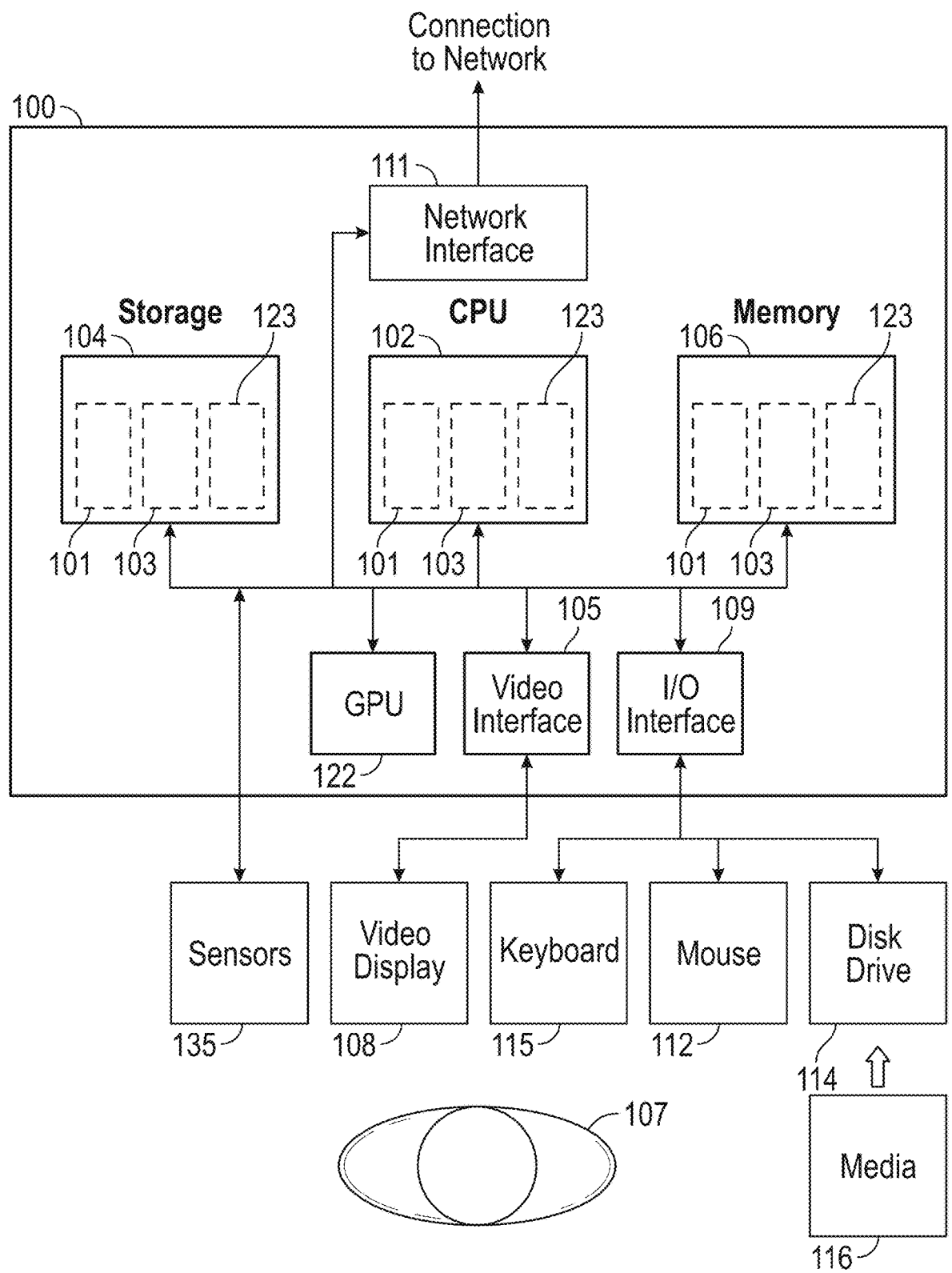

Related U.S. Application Data continuation of application No. 15/993,097, filed on May 30, 2018, now Pat. No. 10,955,834, which is a division of application No. 15/316,249, filed as application No. PCT/EP2015/062380 on Jun. 3, 2015, now Pat. No. 10,086,999.

(51) Int. Cl.

| | | |
|---|---|---|
| *B65G 1/06* | (2006.01) | |
| *G05B 19/418* | (2006.01) | |
| *G06Q 10/08* | (2023.01) | |
| *B66F 9/06* | (2006.01) | |
| *G06Q 10/04* | (2023.01) | |
| *G06Q 50/28* | (2012.01) | |
| *B65G 1/137* | (2006.01) | |
| *B60L 58/12* | (2019.01) | |
| *G06Q 10/087* | (2023.01) | |

(52) U.S. Cl.
CPC ........... *B65G 1/0478* (2013.01); *B65G 1/065* (2013.01); *B65G 1/137* (2013.01); *B65G 1/1378* (2013.01); *B66F 9/063* (2013.01); *G05B 19/4189* (2013.01); *G05B 19/41895* (2013.01); *G05D 1/0255* (2013.01); *G05D 1/0297* (2013.01); *G06Q 10/04* (2013.01); *G06Q 10/08* (2013.01); *G06Q 10/087* (2013.01); *G06Q 50/28* (2013.01); *B65G 1/0421* (2013.01); *B65G 1/1371* (2013.01); *G05D 2201/0216* (2013.01)

(58) Field of Classification Search
CPC .... B65G 1/0464; B65G 1/0478; B65G 1/065; B65G 1/137; B65G 1/1378; B65G 1/0421; B65G 1/1371; B65G 1/0407; B66F 9/063; G05B 19/4189; G05B 19/41895; G06Q 10/04; G06Q 10/08; G06Q 10/087; G06Q 50/28; Y02T 10/70; Y02P 90/02
See application file for complete search history.

(56) References Cited

U.S. PATENT DOCUMENTS

| | | | |
|---|---|---|---|
| 4,918,607 A | 4/1990 | Wible | |
| 4,973,219 A | 11/1990 | Brickner et al. | |
| 5,179,329 A | 1/1993 | Nishikawa et al. | |
| 5,220,263 A | 6/1993 | Onishi et al. | |
| 5,283,739 A * | 2/1994 | Summerville | G05D 1/0289 700/255 |
| 5,511,923 A | 4/1996 | Dunstan | |
| 6,042,321 A | 3/2000 | Labell | |
| 6,345,217 B1 | 2/2002 | Zeitler et al. | |
| 6,589,001 B2 | 7/2003 | Peltomäki | |
| 6,654,662 B1 | 11/2003 | Hognaland | |
| 6,748,292 B2 | 6/2004 | Mountz | |
| 7,912,574 B2 | 3/2011 | Wurman et al. | |
| 7,920,962 B2 | 4/2011 | D'Andrea et al. | |
| 8,220,710 B2 | 7/2012 | Hoffman et al. | |
| 8,381,982 B2 * | 2/2013 | Kunzig | G05D 1/0234 235/462.08 |
| 8,433,469 B2 * | 4/2013 | Harvey | G05D 1/0236 701/23 |
| 8,606,392 B2 | 12/2013 | Wurman et al. | |
| 8,628,289 B1 | 1/2014 | Benedict et al. | |
| 8,758,178 B2 | 6/2014 | Gunji et al. | |
| 8,838,292 B2 * | 9/2014 | Palm | G08G 1/164 701/2 |
| 8,873,829 B1 | 10/2014 | Tyra et al. | |
| 9,002,506 B1 | 4/2015 | Agarwal et al. | |
| 9,020,632 B2 | 4/2015 | Naylor | |
| 9,020,682 B2 | 4/2015 | Shitamoto et al. | |
| 9,024,771 B1 | 5/2015 | Kuffner et al. | |
| 9,037,286 B2 | 5/2015 | Lert | |
| 9,087,314 B2 | 7/2015 | Hoffman et al. | |
| 9,151,770 B2 * | 10/2015 | Reuteler | G01N 35/1095 |
| 9,188,982 B2 * | 11/2015 | Thomson | G05D 1/0274 |
| 9,205,978 B2 * | 12/2015 | Alba | B65G 1/0407 |
| 9,272,845 B2 | 3/2016 | Honkanen et al. | |
| 9,280,154 B2 | 3/2016 | Nagasawa | |
| 9,422,108 B2 | 8/2016 | Hognaland | |
| 9,519,284 B2 * | 12/2016 | Wurman | G05B 19/41895 |
| 9,579,693 B2 | 2/2017 | Hausladen et al. | |
| 9,598,232 B2 | 3/2017 | Flick | |
| 9,598,239 B2 | 3/2017 | Lert et al. | |
| 9,633,879 B2 * | 4/2017 | Ito | H01L 21/67769 |
| 9,682,822 B2 * | 6/2017 | Lindbo | B65G 1/0464 |
| 9,694,975 B2 | 7/2017 | Lert et al. | |
| 9,723,832 B2 | 8/2017 | Camenisch et al. | |
| 9,856,081 B2 * | 1/2018 | Alba | B65G 63/004 |
| 9,886,036 B2 | 2/2018 | Douglas et al. | |
| 10,067,501 B2 | 9/2018 | Wurman et al. | |
| 10,133,267 B2 | 11/2018 | Wurman et al. | |
| 10,251,388 B2 | 4/2019 | Reuteler | |
| 2001/0038784 A1 | 11/2001 | Peltomaki | |
| 2003/0222001 A1 | 12/2003 | Christ | |
| 2004/0010337 A1 | 1/2004 | Mountz | |
| 2004/0067129 A1 | 4/2004 | Krawczyk et al. | |
| 2004/0195310 A1 | 10/2004 | Silverbrook et al. | |
| 2005/0216368 A1 | 9/2005 | Wechsel | |
| 2005/0220600 A1 | 10/2005 | Baker et al. | |
| 2005/0287038 A1 | 12/2005 | Dubrovsky et al. | |
| 2006/0095160 A1 * | 5/2006 | Orita | G05D 1/027 700/248 |
| 2006/0271252 A1 | 11/2006 | Hori et al. | |
| 2007/0162184 A1 | 7/2007 | Pinney et al. | |
| 2007/0293978 A1 | 12/2007 | Wurman et al. | |
| 2008/0001372 A1 | 1/2008 | Hoffman et al. | |
| 2008/0167884 A1 | 7/2008 | Mountz et al. | |
| 2008/0301009 A1 | 12/2008 | Plaster et al. | |
| 2009/0099686 A1 | 4/2009 | Yoshikawa et al. | |
| 2009/0208313 A1 * | 8/2009 | Hayashi | G06Q 10/08 701/2 |
| 2009/0267740 A1 | 10/2009 | Pizzuto | |
| 2009/0312864 A1 | 12/2009 | Hanel | |
| 2010/0198391 A1 | 8/2010 | Schafer | |
| 2010/0316469 A1 | 12/2010 | Lert et al. | |
| 2011/0060449 A1 | 3/2011 | Wurman et al. | |
| 2011/0093134 A1 * | 4/2011 | Emanuel | G05D 1/0297 701/2 |
| 2011/0112758 A1 | 5/2011 | D'Andrea et al. | |
| 2011/0244583 A1 | 10/2011 | Tatsutani et al. | |
| 2011/0295413 A1 | 12/2011 | Hara et al. | |
| 2011/0320376 A1 | 12/2011 | Dearlove et al. | |
| 2012/0030070 A1 * | 2/2012 | Keller | G06Q 10/087 705/28 |
| 2012/0123614 A1 * | 5/2012 | Laws | G05B 19/4189 701/2 |
| 2012/0128240 A1 | 5/2012 | Rothschild | |
| 2012/0136516 A1 * | 5/2012 | Harasaki | G05D 1/0289 701/19 |
| 2012/0143427 A1 | 6/2012 | Hoffman et al. | |
| 2012/0200259 A1 | 8/2012 | Sullivan et al. | |
| 2012/0259482 A1 | 10/2012 | Klaus | |
| 2012/0272500 A1 | 11/2012 | Reuteler et al. | |
| 2012/0303180 A1 | 11/2012 | Wang et al. | |
| 2012/0312875 A1 | 12/2012 | Von Beichmann et al. | |
| 2013/0011226 A1 | 1/2013 | Camenisch et al. | |
| 2013/0060415 A1 * | 3/2013 | Pfaff | B66F 17/003 701/23 |
| 2013/0085625 A1 | 4/2013 | Wolfe et al. | |
| 2013/0103552 A1 | 4/2013 | Hoffman et al. | |
| 2013/0138539 A1 | 5/2013 | Delaney et al. | |
| 2013/0166062 A1 | 6/2013 | Casey et al. | |
| 2013/0166134 A1 * | 6/2013 | Shitamoto | G05D 1/024 701/26 |
| 2013/0197719 A1 | 8/2013 | Nagasawa | |
| 2013/0238117 A1 | 9/2013 | Yagawa | |
| 2013/0277425 A1 | 10/2013 | Sharma et al. | |
| 2013/0302132 A1 | 11/2013 | D'Andrea | |

(56) References Cited

U.S. PATENT DOCUMENTS

| | | | |
|---|---|---|---|
| 2014/0005933 A1 | 1/2014 | Fong et al. | |
| 2014/0017052 A1 | 1/2014 | Honkanen et al. | |
| 2014/0021253 A1 | 1/2014 | Carson et al. | |
| 2014/0025545 A1 | 1/2014 | Carson et al. | |
| 2014/0100690 A1 | 4/2014 | Wurman et al. | |
| 2014/0100999 A1 | 4/2014 | Mountz et al. | |
| 2014/0343717 A1* | 11/2014 | Dorval | G05D 1/00 700/217 |
| 2014/0365258 A1 | 12/2014 | Vestal et al. | |
| 2015/0098775 A1* | 4/2015 | Razumov | B65G 1/0407 414/807 |
| 2015/0117995 A1 | 4/2015 | D'Andrea | |
| 2015/0127143 A1* | 5/2015 | Lindbo | G05B 15/02 700/218 |
| 2015/0227140 A1* | 8/2015 | Douglas | G05D 1/0217 701/23 |
| 2015/0254677 A1 | 9/2015 | Huxham et al. | |
| 2015/0285644 A1* | 10/2015 | Pfaff | G01C 21/20 701/25 |
| 2016/0060034 A1* | 3/2016 | Tan | B65G 1/14 414/807 |
| 2016/0062357 A1* | 3/2016 | Masaki | B25J 9/1694 901/1 |
| 2016/0095309 A1 | 4/2016 | Beat | |
| 2016/0246301 A1 | 8/2016 | Kazama et al. | |
| 2016/0272421 A1* | 9/2016 | Hognaland | B65G 1/0478 |
| 2017/0038770 A1 | 2/2017 | Wurman et al. | |
| 2017/0129702 A1 | 5/2017 | Hognaland et al. | |
| 2017/0313517 A1* | 11/2017 | Agarwal | G06Q 10/087 |
| 2017/0355524 A1 | 12/2017 | Hognaland | |
| 2018/0020659 A1 | 1/2018 | Camenisch et al. | |
| 2018/0075402 A1 | 3/2018 | Stadie et al. | |
| 2018/0196413 A1 | 7/2018 | Wurman et al. | |
| 2018/0276606 A1 | 9/2018 | Stadie et al. | |
| 2018/0276607 A1 | 9/2018 | Stadie et al. | |
| 2018/0276608 A1 | 9/2018 | Stadie et al. | |
| 2018/0354893 A1 | 12/2018 | Wurman et al. | |
| 2019/0064785 A1 | 2/2019 | Wurman et al. | |
| 2020/0012268 A1 | 1/2020 | Stadie et al. | |

FOREIGN PATENT DOCUMENTS

| | | | |
|---|---|---|---|
| CN | 102556440 | 7/2012 | |
| CN | 102622682 | 8/2012 | |
| CN | 103003174 | 3/2013 | |
| CN | 105246802 | 1/2016 | |
| EP | 0476405 | 3/1992 | |
| EP | 0767113 | 4/1997 | |
| EP | 0767113 A2 * | 4/1997 | B65G 1/0464 |
| EP | 1037828 A1 | 9/2000 | |
| EP | 1122194 | 8/2001 | |
| EP | 1138618 | 10/2001 | |
| EP | 1138618 A1 * | 10/2001 | B65G 1/0485 |
| EP | 1037828 B1 | 9/2003 | |
| EP | 2006237 | 12/2008 | |
| EP | 2020388 | 2/2009 | |
| EP | 1513747 | 8/2009 | |
| EP | 2508956 | 10/2013 | |
| EP | 3192753 | 7/2017 | |
| FI | 105668 | 9/2000 | |
| FI | 109588 | 9/2002 | |
| FI | 123447 | 5/2013 | |
| GB | WO-2013167907 A1 * | 11/2013 | B65G 1/0464 |
| JP | H0881013 | 3/1996 | |
| JP | 2001522342 | 11/2001 | |
| JP | 2002202816 | 7/2002 | |
| JP | 2002268743 | 9/2002 | |
| JP | 2004280213 | 10/2004 | |
| JP | 2004280296 | 10/2004 | |
| JP | 2009513457 | 4/2009 | |
| JP | 2009541175 | 11/2009 | |
| JP | 2012197184 | 10/2012 | |
| JP | 2013156747 | 8/2013 | |
| JP | 5346127 | 11/2013 | |
| JP | 5560978 | 7/2014 | |
| NO | WO-9849075 A1 * | 11/1998 | B65G 1/0464 |
| NO | 317366 | 10/2004 | |
| WO | WO 98/49075 | 11/1998 | |
| WO | WO-9849075 A1 * | 11/1998 | B65G 1/0464 |
| WO | WO 03/095339 | 11/2003 | |
| WO | WO 2004/010337 | 1/2004 | |
| WO | WO 2007/007354 | 1/2007 | |
| WO | WO2007/011814 | 1/2007 | |
| WO | WO 2007/149712 | 12/2007 | |
| WO | WO 2010/118412 | 10/2010 | |
| WO | WO 2011/066856 | 6/2011 | |
| WO | WO 2012/127102 | 9/2012 | |
| WO | WO 2013/167907 | 11/2013 | |
| WO | WO-2013167907 A1 * | 11/2013 | B65G 1/0464 |
| WO | WO 2014/075937 | 5/2014 | |
| WO | WO 2014/090684 | 6/2014 | |
| WO | WO 2014/145437 | 9/2014 | |

OTHER PUBLICATIONS

Defendant's Opening Claim Construction Brief, *Ocado Innovation Ltd. and Ocado Solutions Ltd.* vs. *Autostore AS and Autostore Systems, Inc.*, Case No. 1:21-cv-00041-JL, dated Aug. 1, 2022, in 65 pages.

International Search Report (PCT/ISA/210) dated Feb. 15, 2016, by the European Patent Office as the International Searching Authority for International Application No. PCT/EP2015/062380.

Written Opinion (PCT/ISA/237) dated Feb. 15, 2016, by the European Patent Office as the International Searching Authority for International Application No. PCT/EP2015/062380.

Bay, "Design of the Army-Ant Cooperative Lifting Robot", vol. 2, No. 1, Mar. 1995, pp. 5-7.

Mataric et al., "Cooperative Multi-Robot Box-Pushing", Aug. 5, 1995, pp. 556-561.

Lueth et al., "Task Description Decomposition, and Allocation in a Distributed Autonomous Multi-Agent Robot System", vol. 3, Sep. 1994, pp. 1516-1523.

Office Action dated Aug. 20, 2019, by the U.S. Patent and Trademark Office in U.S. Appl. No. 15/993,097. (24 pages).

"AutoStore Logistics—Technical Presentation", Retrieved from www.youtube.com/walch?v=iyVDMp2bL9c.

Marc Wulfraat, "Swisslog AutoStore Review: An In-Depth Review of Automated Split Case Picking Technology for Distribution", MWPVL Logistics Consultants, www.mwpvl.com/hlmliswisslog_autostore_review.html http://www.mwpvl.com/html/swisslog_autostore_review.html, (Aug. 13, 2018).

Notice of Allowance dated Jun. 19, 2019, by the U.S. Patent and Trademark Office in corresponding U.S. Appl. No. 15/992,899. (12 pages).

Office Action Received dated Oct. 11, 2019 in the corresponding U.S. Appl. No. 15/992,899, 6 pages.

Non-Final Office Action dated Aug. 20, 2019, by the U.S. Patent and Trademark Office in corresponding U.S. Appl. No. 15/993,097. (24 pages).

Office Action dated Feb. 13, 2020, by the U.S. Patent and Trademark Office in corresponding U.S. Appl. No. 15/993,097.

Office Action Applicant-Initiated Interview Summary dated Apr. 10, 2020, by the U.S. Patent and Trademark Office in corresponding U.S. Appl. No. 15/993,097 (4 pages).

Office Action dated Sep. 26, 2019, by the U.S. Patent and Trademark Office in corresponding U.S. Appl. No. 15/993,208 (27 pages).

Office Action dated Mar. 25, 2020 in corresponding U.S. Appl. No. 15/993,208, 29 pages.

Third Party Observation for PCT Application PCT/EP2015/062380, filed Jun. 3, 2016, in 34 pages.

The Examiner's attention is directed to copending U.S. Appl. No. 16/575,906, filed Sep. 19, 2019.

The Examiner's attention is directed to copending U.S. Appl. No. 15/993,097, filed May 30, 2018.

The Examiner's attention is directed to copending U.S. Appl. No. 15/993,208, filed May 30, 2018.

(56) References Cited

OTHER PUBLICATIONS

Complaint for Patent Infringement with Exhibits, *Ocado Innovation Ltd. and Ocado Solutions Ltd. vs. Autostore AS and Autostore System Inc.*, Case No. 1:21-cv-00041-JL, filed Jan. 17, 2021, in 570 pages (two uploads).
Amended Complaint for Patent Infringement with Exhibits, *Ocado Innovation Ltd. and Ocado Solutions Ltd. vs. Autostore AS and Autostore System Inc.*, Case No. 1:21-cv-00041-JL, filed Feb. 16, 2021, in 585 pages (two uploads).
Defendant's Motion to Dismiss with Memorandum of Law in Support of Motion and Exhibits, *Ocado Innovation Ltd. and Ocado Solutions Ltd. vs. Autostore AS and Autostore Systems, Inc.*, Case No. 1:21-cv-00041-JL, filed Mar. 22, 2021, in 121 pages.
Second Amended Complaint for Patent Infringement with Exhibits, *Ocado Innovation Ltd. and Ocado Solutions Ltd. vs. Autostore AS and Autostore System Inc.*, Case No. 1:21-cv-00041-JL, filed Apr. 23, 2021, in 790 pages (two uploads).
Defendant's Partially Renewed Motion to Dismiss with Memorandum of Law in Support of Partially Renewed Motion and Exhibits, *Ocado Innovation Ltd. and Ocado Solutions Ltd. vs. Autostore AS and Autostore Systems, Inc.*, Case No. 1:21-cv-00041-JL, filed May 7, 2021, in 111 pages.
Plaintiffs' Opposition to Defendant's Partially Renewed Motion to Dismiss, *Ocado Innovation Ltd. and Ocado Solutions Ltd. vs. Autostore AS and Autostore Systems, Inc.*, Case No. 1:21-cv-00041-JL, filed May 21, 2021, in 37 pages.
Defendant's Reply in Support of Partially Renewed Motion to Dismiss, *Ocado Innovation Ltd. and Ocado Solutions Ltd. vs. Autostore AS and Autostore Systems, Inc.*, Case No. 1:21-cv-00041-JL, filed May 28, 2021, in 18 pages.
Defendants' Notice of Supplemental Authority in Support of Partially Renewed Motion to Dismiss, *Ocado Innovation Ltd. and Ocado Solutions Ltd. vs. Autostore AS and Autostore Systems, Inc.*, Case No. 1:21-cv-00041-JL, filed Jun. 22, 2021, in 21 pages.
Plaintiffs' Notice of Supplemental Authority in Opposition to Partially Renewed Motion to Dismiss, *Ocado Innovation Ltd. and Ocado Solutions Ltd. vs. Autostore AS and Autostore Systems, Inc.*, Case No. 1:21-cv-00041-JL, filed Jun. 23, 2021, in 38 pages.
Defendant's Notice of Supplemental Authority in Support of Partially Renewed Motion to Dismiss, *Ocado Innovation Ltd. and Ocado Solutions Ltd. vs. Autostore AS and Autostore Systems, Inc.*, Case No. 1:21-cv-00041-JL, filed Jul. 29, 2021, in 15 pages.
David Silver, "Cooperative Pathfinding", American Association for Artificial Intelligence, retrieved from https://www.aaai.org/Papers/AIIDE/2005/AIIDE05-020.pdf, dated 2005, in 6 pages.
Bnaya et al., "Conflict-Oriented Windowed Hierarchical Cooperative A*", 2014 IEEE International Conference on Robotics and Automation, May 31, 2014, pp. 3743-3748.
"An Introduction To The AutoStore System," AutoStore Concept Ver. 01.10a Commercial, dated 2004, in 36 pages.
Bräunl, "Embedded Robotics"—Mobile Robot Design and Applications with Embedded Systems, pp. 1-13 and 104, published 2006, in 14 pages.
Borenstein et al., "Where am I? Sensors and Methods for Mobile Robotic Positioning," University of Michigan, pp. 1-11 and 180-181, dated 1996, in 13 pages.
Memorandum Order Denying Defendant's Partially Renewed Motion to Dismiss, *Ocado Innovation Ltd. and Ocado Solutions Ltd. vs. Autostore AS and Autostore Systems, Inc.*, Case No. 1:21-cv-00041-JL, filed Aug. 13, 2021, in 38 pages.
Defendant's Answer, Affirmative Defenses, and Counterclaims to Plaintiff's Second Amended Complaint, *Ocado Innovation Ltd. and Ocado Solutions Ltd. vs. Autostore AS and Autostore Systems, Inc.*, Case No. 1:21-cv-00041-JL, filed Aug. 27, 2021, in 49 pages.
Plaintiff's Answer to Defendant's Counterclaims, *Ocado Innovation Ltd. and Ocado Solutions Ltd. vs. Autostore AS and Autostore Systems, Inc.*, Case No. 1:21-cv-00041-JL, filed Oct. 1, 2021, in 9 pages.
Plaintiff's Motion to Strike Defendant's Affirmative Defense of Inequitable Conduct and Memorandum in Support of Motion, *Ocado Innovation Ltd. and Ocado Solutions Ltd. vs. Autostore AS and Autostore Systems, Inc.*, Case No. 1:21-cv-00041-JL, filed Oct. 1, 2021, in 48 pages.
Complaint for Patent Infringement with Exhibits, *Ocado Innovation Ltd. and Ocado Solutions Ltd. vs. Autostore AS and Autostore System Inc.*, Case No. 1:21-cv-00806-JL, filed Oct. 6, 2021, in 438 pages.
Plaintiff's Reply Memorandum in Further Support of Motion to Strike Defendant's Affirmative Defense of Inequitable Conduct, *Ocado Innovation Ltd. and Ocado Solutions Ltd. vs. Autostore AS and Autostore Systems, Inc.*, Case No. 1:21-cv-00041-JL, filed Oct. 22, 2021, in 14 pages.
Corrected Order of Consolidation Consolidating Case No. 1:21-cv-00041-JL and 1:21-cv-00806-JL, *Ocado Innovation Ltd. and Ocado Solutions Ltd. vs. Autostore AS and Autostore Systems, Inc.*, filed Dec. 8, 2021, in 2 pages.
Defendant's Answer, Affirmative Defenses, and Counterclaims to Plaintiff's Complaint in Former Case No. 1:21-cv-00806-JL, *Ocado Innovation Ltd. and Ocado Solutions Ltd. vs. Autostore AS and Autostore Systems, Inc.*, Case No. 1:21-cv-00041-JL, filed Dec. 10, 2021, in 36 pages.
Memorandum Order Granting Plaintiff's Motion to Strike Defendant's Inequitable Conduct Defense, *Ocado Innovation Ltd. and Ocado Solutions Ltd. vs. Autostore AS and Autostore Systems, Inc.*, Case No. 1:21-cv-00041-JL, filed Dec. 30, 2021, in 13 pages.
Plaintiff's Answer to Defendant's Counterclaims in Former Case No. 1:21-cv-00806-JL, *Ocado Innovation Ltd. and Ocado Solutions Ltd. vs. Autostore AS and Autostore Systems, Inc.*, Case No. 1:21-cv-00041-JL, filed Dec. 31, 2021, in 6 pages.
Gehlod et al., "Graph Traversal Technique for Grid Based Robot Navigation," International Journal of Advanced Research in Computer and Communication Engineering, Jul. 1, 2013, pp. 2698-2702, available at https://ijarcce.com/upload/2013/july/36-h-Graph_Traversal_Technique_for_Grid_Based_Robot_Navigation.pdf, in 5 pages.
Choset et al., "Robotic Motion Planning:-735, Howie Choset with slides from Ayorkor Mills," May 6, 2011, available at https://www.cs.cmu.edu/~motionplanning/lecture/AppH-astar-dstar_howie.pdf, in 132 pages.
Defendant's Opposition to Plaintiff's Motion to Strike, *Ocado Innovation Ltd. and Ocado Solutions Ltd. vs. Autostore AS and Autostore Systems, Inc.*, Case No. 1:21-cv-00041-JL, filed Jun. 7, 2022, in 19 pages.
Plaintiff's Reply Memorandum in Further Support of Motion to Strike Defendant's Untimely Proposed Claim Constructions, *Ocado Innovation Ltd. and Ocado Solutions Ltd. vs. Autostore AS and Autostore Systems, Inc.*, Case No. 1:21-cv-00041-JL, filed Jun. 13, 2022, in 6 pages.
Defendant's Sur-Reply in Opposition to Plaintiff's Motion to Strike, *Ocado Innovation Ltd. and Ocado Solutions Ltd. vs. Autostore AS and Autostore Systems, Inc.*, Case No. 1:21-cv-00041-JL, filed Jun. 14, 2022, in 9 pages.
Defendant's Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 1, 2022, in 5 pages.
Plaintiff's Opposition to Defendant's Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 7, 2022, in 12 pages.
Defendant's Reply in Support of Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 10, 2022, in 9 pages.
Joint Claim Construction and Prehearing Statement, *Ocado Innovation Ltd. and Ocado Solutions Ltd. vs. Autostore AS and Autostore Systems, Inc.*, Case No. 1:21-cv-00041-JL, filed Jun. 3, 2022, in 80 pages.
Defendant's SPR 6.1(a) Disclosure of Claim Terms Proposed for Construction, *Ocado Innovation Ltd. and Ocado Solutions Ltd. vs.*

(56) References Cited

OTHER PUBLICATIONS

*Autostore AS and Autostore Systems, Inc.*, Case No. 1:21-cv-00041-JL, dated Mar. 24, 2022, in 8 pages.

Plaintiff's Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated Apr. 21, 2022, in 28 pages.

Plaintiff's Supplemental Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated May 13, 2022, in 29 pages.

Declaration of Dr. Brian Pfeifer in Support of Plaintiff's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 35 pages.

Declaration of Dr. Petros Ioannou in Support of Defendant's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 78 pages.

Declaration of Dr. Raffaello D'Andrea in Support of Plaintiff's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 64 pages.

Declaration of Dr. Matthew Spenko in Support of Defendant's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 22 pages.

Plaintiff's Updated Supplemental Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated May 27, 2022, in 36 pages.

Rebuttal Declaration of Dr. Stephen Derby Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 38 pages.

Rebuttal Declaration of Dr. Petros Ioannou Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 135 pages.

Rebuttal Declaration of Dr. Brian Pfeifer Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 15 pages.

Rebuttal Declaration of Dr. Raffaello D'Andrea Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 41 pages.

Rebuttal Declaration of Dr. Matthew Spenko Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 6 pages.

Amended Joint Claim Construction and Prehearing Statement, *Ocado Innovation Ltd. and Ocado Solutions Ltd. vs. Autostore AS and Autostore Systems, Inc.*, Case No. 1:21-cv-00041-JL, dated Aug. 5, 2022, in 51 pages.

Defendant's Reply Claim Construction Brief, *Ocado Innovation Ltd. and Ocado Solutions Ltd. vs. Autostore AS and Autostore Systems, Inc.*, Case No. 1:21-cv-00041-JL, dated Aug. 22, 2022, in 66 pages.

Plaintiff's Responsive Claim Construction Brief, *Ocado Innovation Ltd. and Ocado Solutions Ltd. vs. Autostore AS and Autostore Systems, Inc.*, Case No. 1:21-cv-00041-JL, dated Aug. 22, 2022, in 64 pages.

Gawrilow et al., "Dynamic Routing of Automated Guided Vehicles in Real-time," Technische Universitat Berlin, Fakultat Mathematikund Naturwissenschaften, Institutfur Mathematik, No. 039/2007, dated Oct. 10, 2007, in 16 pages.

Vivaldini et al., "Robotic Forklifts for Intelligent Warehouses: Routing, Path Planning, and Autolocalization," IEEE, dated 2010, in 6 pages.

Vivaldini et al., "Automatic Routing System for Intelligent Warehouses," IEEE, dated Feb. 28, 2010, in 6 pages.

Transcript of Markman Hearing—Morning Session, *Ocado Innovation Ltd. and Ocado Solutions Ltd. vs. Autostore AS and Autostore Systems, Inc.*, Case No. 1:21-cv-00041-JL, dated Sep. 29, 2022, in 115 pages.

Transcript of Markman Hearing—Afternoon Session, *Ocado Innovation Ltd. and Ocado Solutions Ltd. vs. Autostore AS and Autostore Systems, Inc.*, Case No. 1:21-cv-00041-JL, dated Sep. 29, 2022, in 130 pages.

Assented-To Motion for Leave to File Supplemental Responses to Certain of the Court's Markman Hearing Questions and Plaintiff's Proposed Supplemental Responses, *Ocado Innovation Ltd. and Ocado Solutions Ltd. vs. Autostore AS and Autostore Systems, Inc.*, Case No. 1:21-cv-00041-JL, dated Oct. 12, 2022, in 25 pages.

Defendant's Response to Plaintiff's Supplemental Responses to Certain of the Court's Markman Hearing Questions, *Ocado Innovation Ltd. and Ocado Solutions Ltd. vs. Autostore AS and Autostore Systems, Inc.*, Case No. 1:21-cv-00041-JL, dated Oct. 20, 2022, in 31 pages.

Declaration of Boloori in Support of Defendant's Opposition to Plaintiff's Motion to Strike with Chart Summarizing Certain Plaintiff Statements in Claim Construction Briefing and Motion to Strike, *Ocado Innovation Ltd. and Ocado Solutions Ltd. vs. Autostore AS and Autostore Systems, Inc.*, Case No. 1:21-CV-00041-JL, dated Dec. 9, 2022, in 15 pages.

Plaintiff's Supplemental Claim Construction Brief, *Ocado Innovation Ltd. and Ocado Solutions Ltd. vs. Autostore AS and Autostore Systems, Inc.*, Case No. 1:21-cv-00041-JL, dated Jan. 5, 2023, in 6 pages.

Defendant's Supplemental Brief in Response to Plaintiff's Supplemental Claim Construction Brief, *Ocado Innovation Ltd. and Ocado Solutions Ltd. vs. Autostore AS and Autostore Systems, Inc.*, Case No. 1:21-cv-00041-JL, dated Jan. 10, 2023, in 9 pages.

* cited by examiner

METHODS, SYSTEMS AND APPARATUS FOR CONTROLLING MOVEMENT OF TRANSPORTING DEVICES

CROSS REFERENCE TO RELATED APPLICATIONS

This application is a continuation application of U.S. patent application Ser. No. 17/149,426 filed on Jan. 14, 2021, which is a continuation application of U.S. patent application Ser. No. 15/993,097 filed on May 30, 2018, which is a divisional application of U.S. patent application Ser. No. 15/316,249 filed on Dec. 5, 2016, which is a U.S. National Stage application based on International Patent Application No. PCT/EP2015/062380 filed on Jun. 3, 2015, which claims priority to British Patent Application No. 1409883.4 filed on Jun. 3, 2014, the entire content of all of which is incorporated herein by reference.

The present invention relates to methods systems and apparatus for controlling movement of transporting devices. More specifically but not exclusively it relates to storage systems and methods for retrieving units from a storage system. In particular, but not exclusively, the invention further relates to systems and methods for coordinating and controlling product movement.

Certain commercial and industrial activities require systems that enable the storage and retrieval of a large number of different products.

One known system for the storage and retrieval of items in multiple product lines involves arranging storage bins or containers on rows of shelves arranged in aisles.

Each bin or container holds one or more products of one or more product types. The aisles provide access between the rows of shelves, so that the required products can be retrieved by operatives or robots that circulate in the aisles.

It will be appreciated, however, that the need to provide aisle space to access the products means that the storage density of such systems is relatively low. In other words, the amount of space actually used for the storage of products is relatively small compared to the amount of space required for the storage system as a whole.

For example, online retail businesses selling multiple product lines, such as online grocers and supermarkets, require systems that are able to store tens or even hundreds of thousands of different product lines. The supply chains and warehouse operations of these businesses are highly dependent on their ability to organise, retrieve and return items to various containers.

In particular implementations of various warehouse and storage facility designs, containers may be stacked on top of one another and the stacks may be arranged in rows. The containers may then be accessed from above, removing the need for aisles between the rows and allowing more containers to be stored in a given volume or area.

In some of these implementations, the containers are accessed by one or more robotic or automated means, which navigate through a grid of pathways to access containers for a variety of different operations, such as moving a container from one location to another for handling, conducting operations upon a container, returning a container to a position in a warehouse, etc.

The co-ordination of the movement of the one or more robotic or otherwise automated means may be an important consideration in determining the overall efficiency and scalability of a system for storage and retrieval of a large number of different products.

In U.S. Pat. No. 6,654,662 and EP 1037828, a storage and retrieval system is described wherein "parallelepiped-shaped" containers are "deep-stacked and stock joined" in a vertical framework, forming several horizontal layers of containers whose positions at any time are random. A computer system continuously monitors and records the positions of the containers; desired containers are retrieved from the top of the framework, unwanted containers being moved, one at a time, and relocated to temporary locations until the desired container is retrieved, at which point the temporarily-relocated containers are returned to the same stack, and replaced in the same relative order; and the desired container is (eventually) returned to the top of original stack.

The system described in U.S. Pat. No. 6,654,662 and EP 1037828 has several horizontal coordinate forming layers of containers whose positions at any time are random. Further, temporarily-relocated containers are returned to the original stack, so that their relative order is retained, and wherein the desired container is returned to the top of the stack.

In contrast to the provided system, it may be advantageous to provide deliberate container placement that may be optimised in the horizontal and the vertical domains based on different criteria such as traffic flows, frequency of access (historic, current and forecast), specific container groupings, access time, fire-resistance and or other environmental partitions.

There is need, therefore, for systems and processes for coordinating and controlling product movement.

According to exemplary embodiments, system is provided for controlling movement of transporting devices arranged to transport containers, the containers being stored in stacks arranged in a facility, the system comprising: a facility having pathways arranged in a grid-like structure above stacks, the transporting devices being configured to operate on the grid-like structure; and a control unit configured to determine at least one task to be performed by at least one transporting device, wherein the at least one task is determined based on at least one of: transporting device battery condition, transporting device damage, transporting device maintenance issues, and transporting device service issues.

A method is also disclosed for controlling movement of transporting devices arranged to transport containers, the containers being stored in stacks arranged in a facility, the facility having pathways arranged in a grid-like structure above the stacks, the transporting devices configured to operate on the grid-like structure, the method comprising: determining at least one task to be performed by at least one of the transporting devices; and wherein the at least one task is determined based on at least one of: transporting device battery condition, transporting device damage, transporting device maintenance issues, and transporting device service issues.

According to some embodiments of the invention, a system is provided for controlling the movement of one or more of transporting devices transporting a plurality of objects and operating in a facility having a plurality of pathways, the system comprising:
 one or more computers configured to execute computer instructions which when executed provide:
 one or more utilities determining and reserving routes for moving the one or more transporting devices through the plurality of pathways; and
 one or more utilities providing a clearance system for permitting or stopping movement of the one or more transporting devices to avoid collisions.

In some embodiments, the system further comprises one or more utilities configured to optimise the movement and actions of the one or more transporting devices through the plurality of pathways.

In some embodiments, the system further comprises one or more utilities configured to optimise the placement of the plurality of objects by the one or more transporting devices in the facility.

In some embodiments, the system further comprises one or more utilities that control movement or operations conducted within one or more workstations.

In some embodiments, the one or more utilities that optimise the movement and actions utilize pathfinding algorithms.

In some embodiments, the one or more utilities optimise the movement and actions using congestion mitigation techniques.

In some embodiments, the one or more utilities optimise the movement and actions using machine learning techniques.

In some embodiments, the one or more utilities optimise the placement of the plurality of objects within the facility, and update stock levels of the facility based on the placement of one or more of the plurality of objects within the facility.

In some embodiments, the one or more utilities control the movement of the one or more of transporting devices based at least on throughput of the one or more workstations.

In some embodiments, the one or more utilities provide a clearance system configured to be tolerant to missed communications with at least one of the one or more transporting devices.

In some embodiments, the one or more utilities determine and reserve routes, and instruct a plurality or transporting devices to cooperate in transporting one or more of the plurality of objects.

In some embodiments, the one or more utilities determine and reserve routes to move idle transporting devices from otherwise optimal routes for other transporting devices.

In some embodiments, one or more of the plurality of objects are stored within a plurality of containers.

In some embodiments, the facility stores the plurality of containers in a plurality of stacks.

In some embodiments, the one or more utilities determine and reserve routes for transporting one or more of the plurality of containers.

In some embodiments, the one or more utilities determine and reserve routes to control one or more of the plurality of transporting devices to retrieve one or more of the plurality of containers from within one or more of the plurality of stacks.

In some embodiments, retrieving the one or more containers from within the one or more stacks further requires moving one or more other containers in the stack prior to accessing the one or more containers for retrieval.

In some embodiments, moving the one or more other containers comprises placing each of the one or more other containers in an optimised position within the facility.

In some embodiments, the facility is divided into a plurality of sub-grids to reduce processing complexity.

In some embodiments, one or more control commands to control the movement of the plurality of transporting devices is provided to the plurality of transporting devices in advance of the movement of the plurality of transporting devices.

In various aspects, the disclosure herein provides methods, systems, and corresponding machine-executable coded instruction sets for coordinating and controlling product movement in at least a semi-automated order fulfillment system comprising a holding facility. In various aspects, the disclosure provides improvements in the coordination and control of the movement of robots handling a variety of goods in fulfillment of orders which, in some instances, may include a variety of items having different sizes, weights, fragilities and other characteristics.

In various embodiments of the above and other aspects, such a holding facility can include one or more storage apparatuses. In the same or other embodiments, at least a portion of the holding facility may be configured to move dynamically.

In the same or other embodiments, the holding facility may be shared between two or more workstations.

The invention will now be described with reference to the accompanying diagrammatic drawings, the drawings being to be exemplary and not limiting, and in which like references are intended to refer to like or corresponding parts.

FIG. 1 is an illustrative diagram providing a generic computer hardware and software implementation of certain aspects, as detailed in the description.

Figure 2:
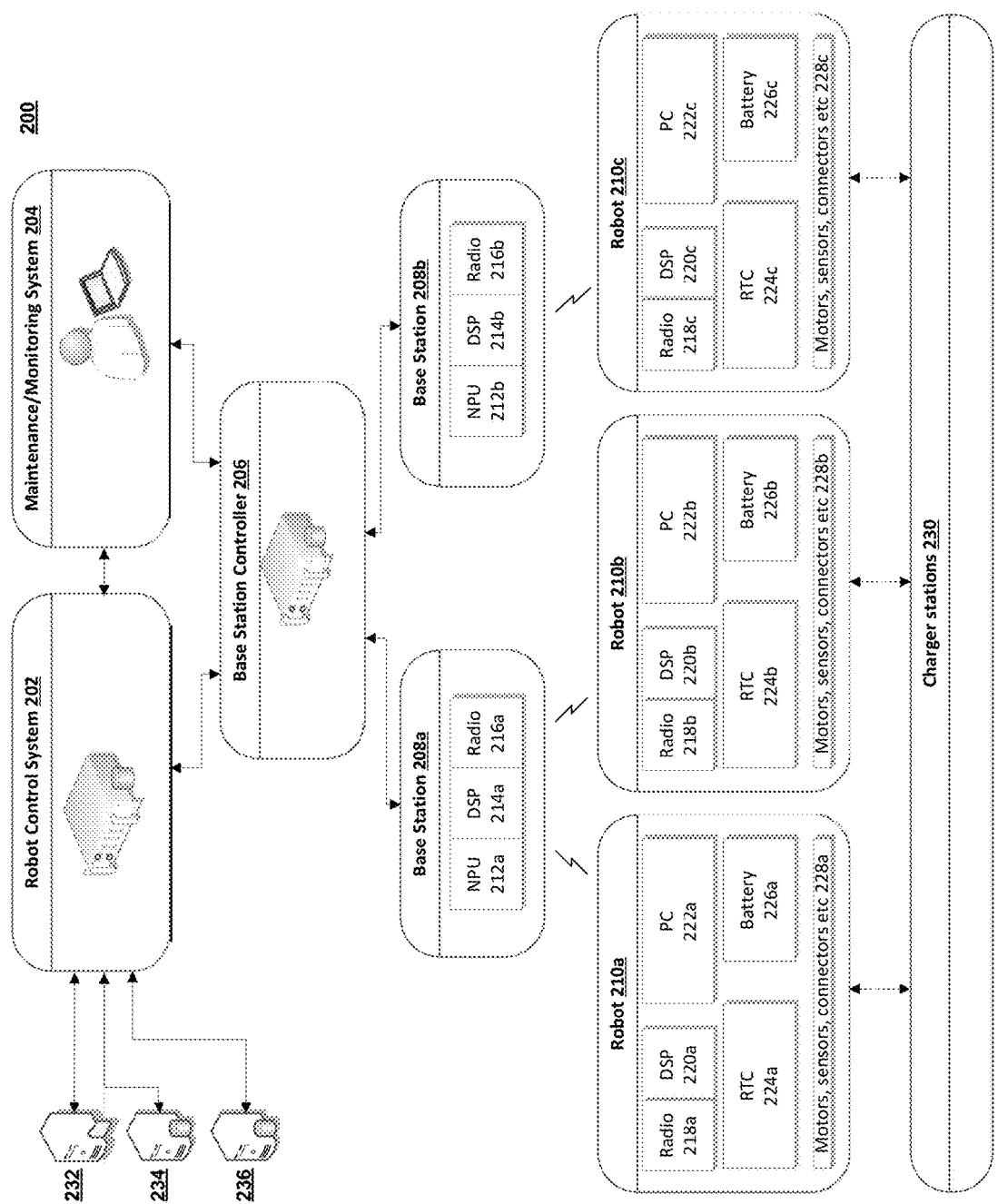

FIG. 2 provides a sample block diagram of the system, according to some embodiments of the invention.

Figure 3:
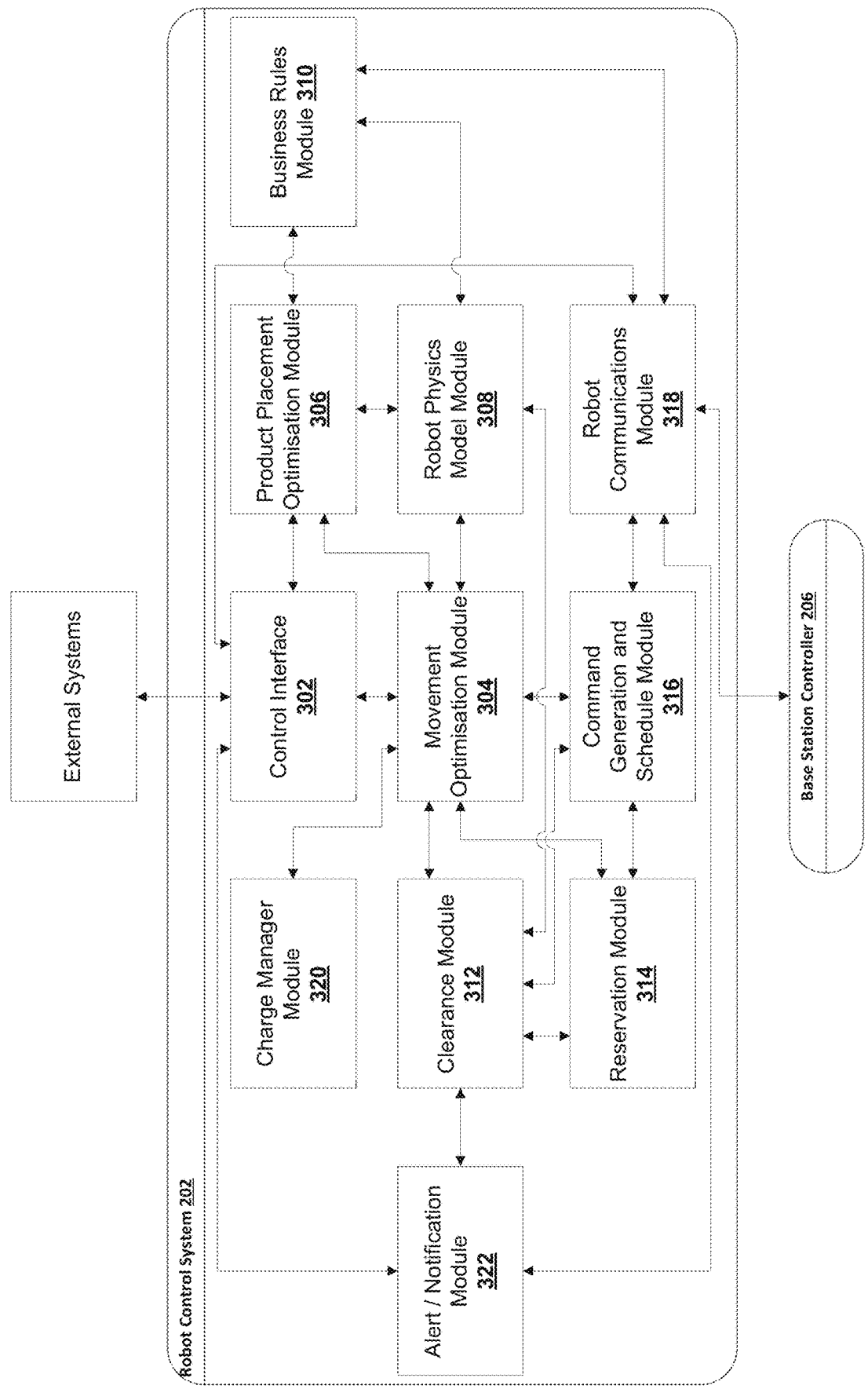

FIG. 3 provides a sample block diagram of the robot control system in more detail, according to some embodiments of the invention.

Figure 4:
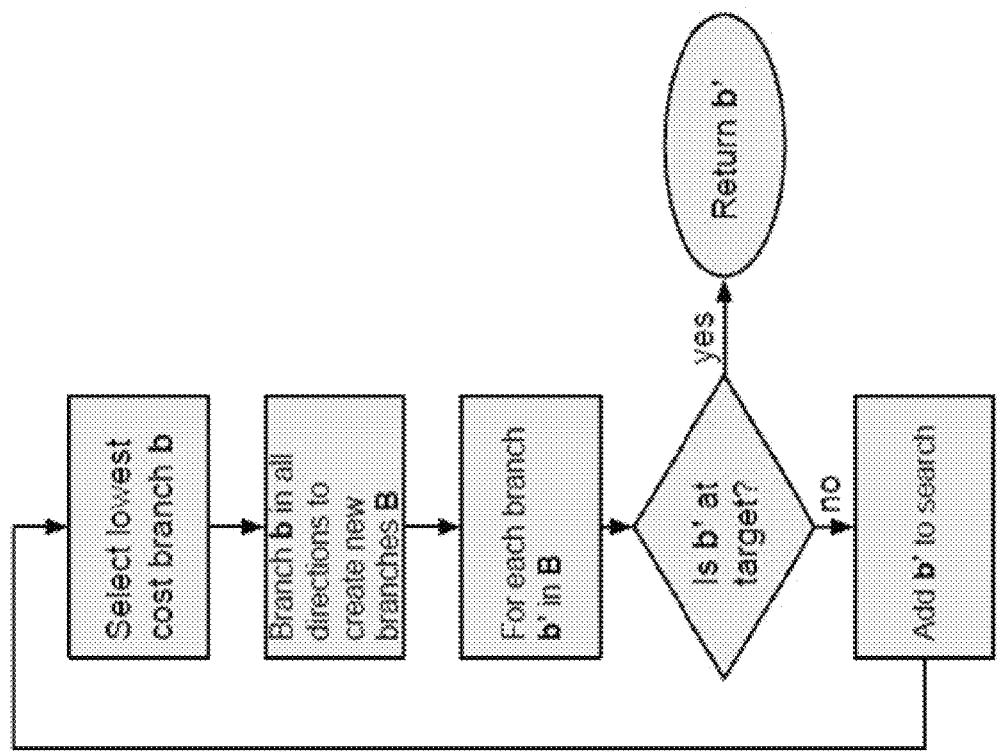

FIG. 4 provides a sample workflow for a sample recursive path-finding algorithm, according to some embodiments of the invention.

Figure 5:
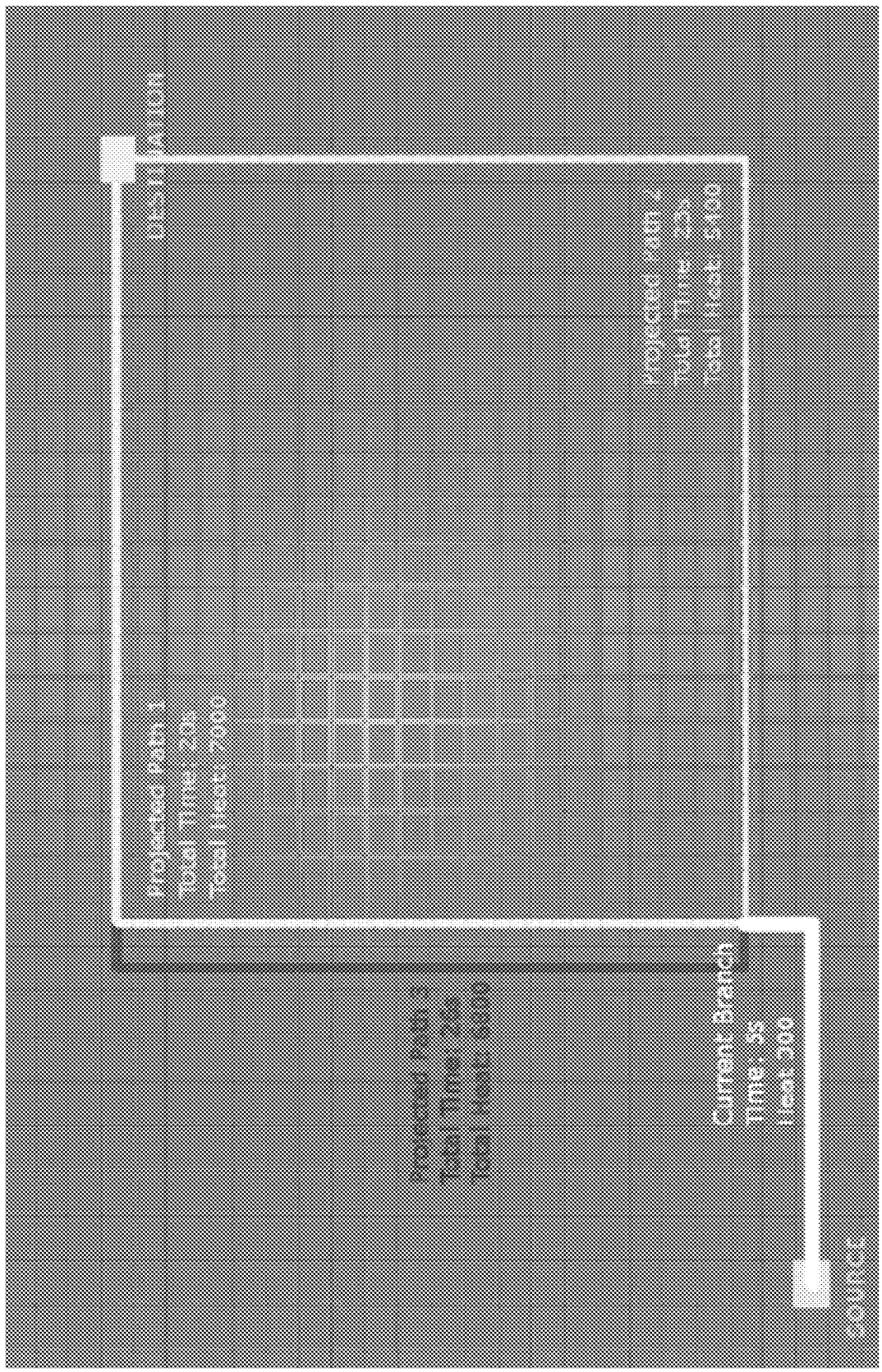

FIG. 5 provides a sample heat map, according to some embodiments of the invention.

Figures 6A, 6B:
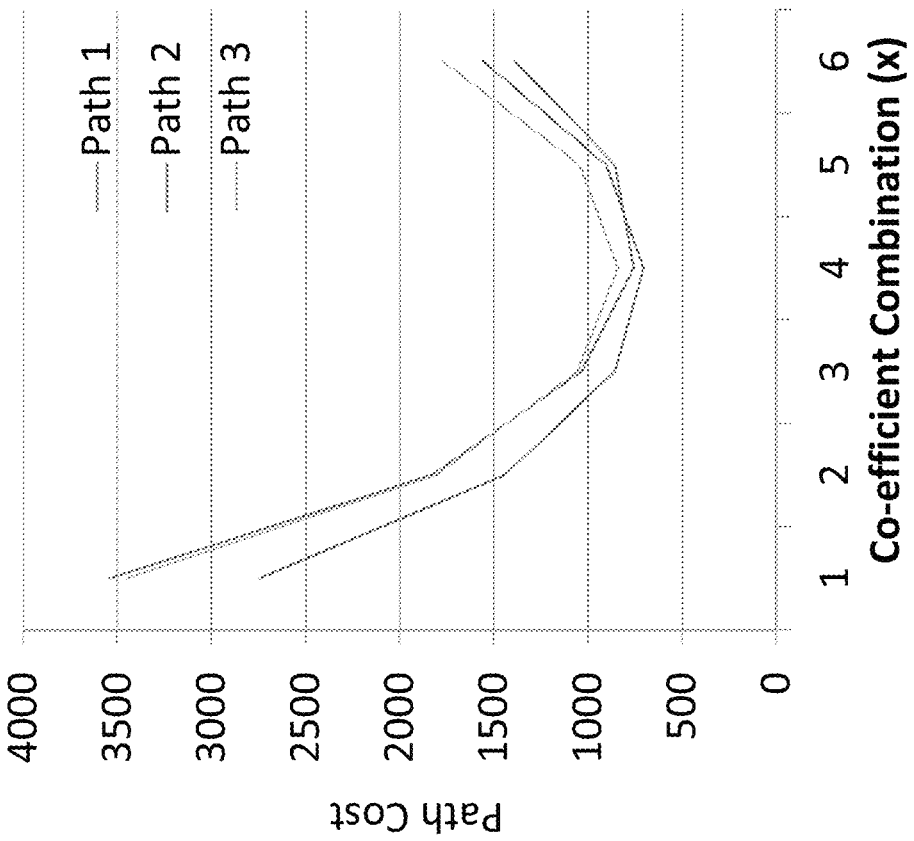

FIG. 6a provides a table demonstrating how a search branch's projected cost could change as a result of using different coefficients in the path search algorithm. These coefficients could be derived using refinement by a machine learning technique according to some embodiments of the invention.

FIG. 6b illustrates how the use of different cost coefficients demonstrated in FIG. 6a changes which branch will be selected by the next iteration of the search algorithm.

Figure 7:
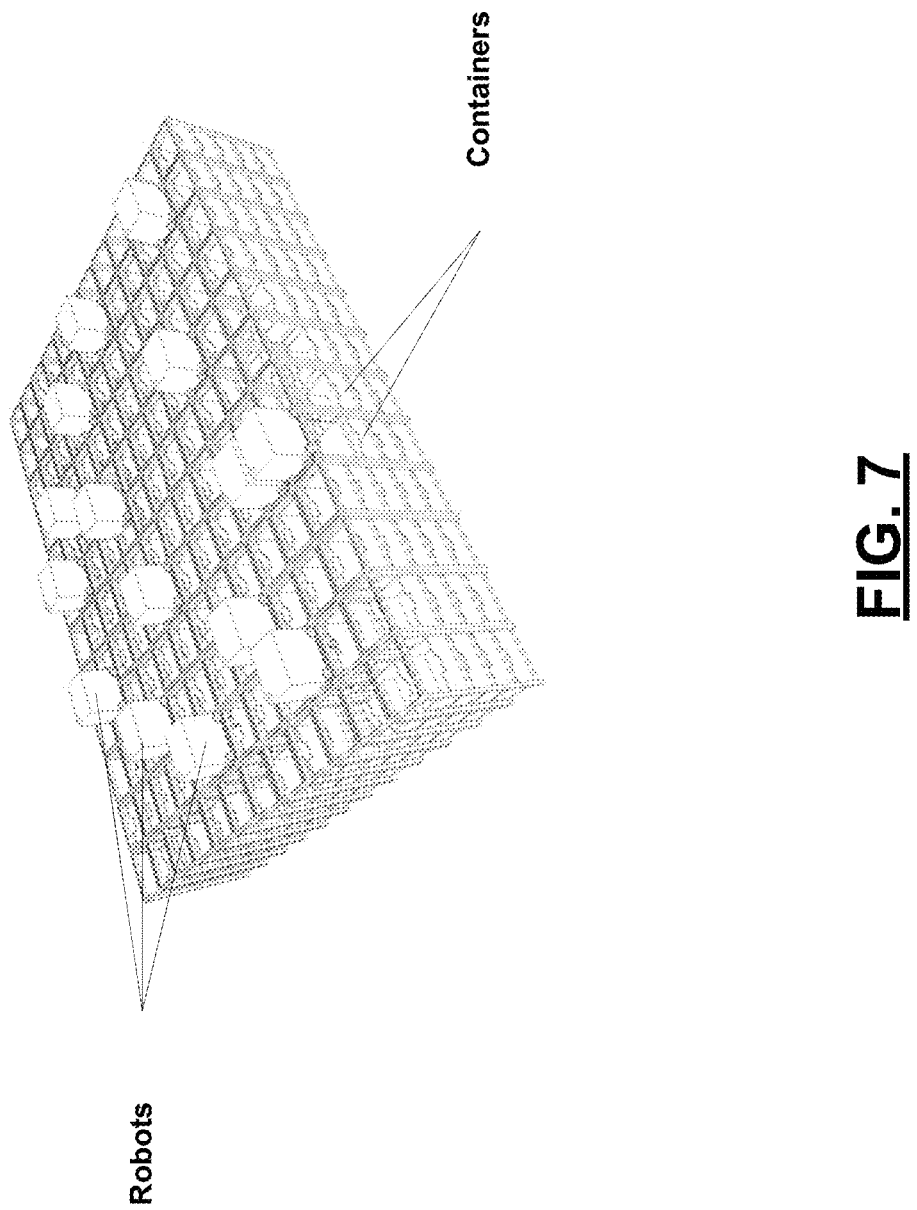

FIG. 7 provides a sample perspective view of a warehouse, according to some embodiments of the invention.

Figure 8:
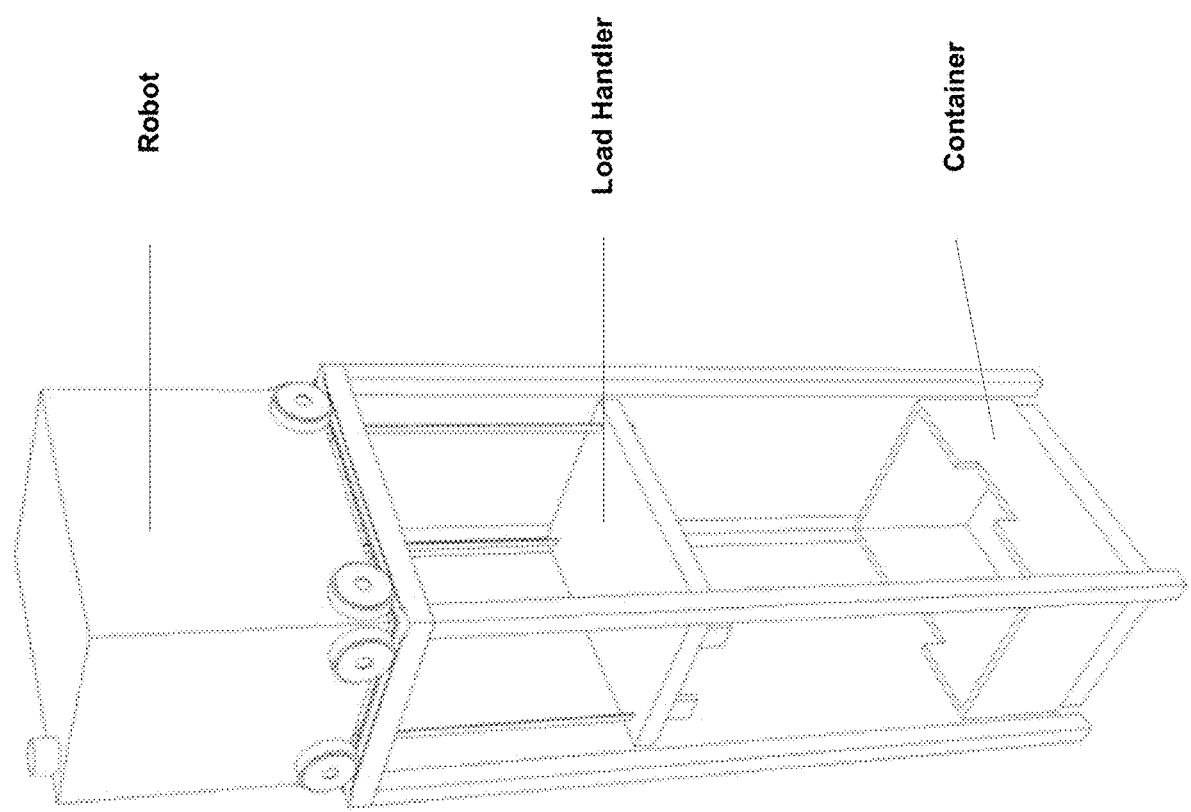

FIG. 8 provides a sample diagram of a robot with a winch and a container, according to some embodiments of the invention.

Preferred embodiments of methods, systems, and apparatus suitable for use in implementing the invention are described through reference to the drawings.

Fully- and semi-automatic goods storage and retrieval systems, various aspects of which may sometimes be referred to as "order fulfillment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as containers), and stacking and/or otherwise disposing the containers in racking or vertically in layers, such that individual containers may be accessible by wholly or partially-automated container retrieval systems.

In some embodiments, the systems may include systems beyond goods storage and retrieval, such as systems where goods are processed, repaired, manipulated, assembled, sorted, etc., and the movement of goods, products, parts, components, subcomponents is required, both within a facility and/or to other facilities or transportation.

For the purposes of this specification, a storage facility for the storage, retrieval, processing and/or fulfillment of orders, wherein access to such goods is provided by fully or semi-automatic retrieval, is referred to as a "hive". The "hive" may be comprised of a grid-like layout of the potential pathways for the movement of robotic elements or devices ("robot") to traverse and perform operations at various locations in the "hive" (referred to as the "grid").

The specification is not limited to only systems that have "hives", "grids", and/or "robots", but systems that broadly control and/or coordinate the movement and/or activities of a plurality of devices may also be contemplated. These devices may be configured for the transportation of various items, such as goods and/or products, and/or containers that may be empty and/or holding such goods and/or products. These devices may further be involved in the fulfillment of orders but may also be involved in any other type of activity, such as transporting containers to and from workstations, moving objects from source locations to target locations, etc.

As indicated, the devices may be robots, and the devices may be configured to move around a hive, and/or communicate with a control system to coordinate/receive instructions on their movement. In some embodiments, the devices may be configured to communicate amongst themselves, and/or coordinate movement amongst themselves. Accordingly, the devices may have various transporting means, communications means, powering means, processing means, processor means, sensor means, monitoring means, on-board workstations, electronic/physical storage means and/or lifting/transporting means (such as a winch, arms, etc.).

While the devices may be configured to receive instructions from the system, there may be situations where the devices lose communications with the system, have degraded communications pathways and/or do not receive communications from the system within a particular time frame.

In some embodiments, the devices may also be configured to communicate amongst each other, and/or sense the presence of each other. These communications and/or sensory inputs may be utilized, for example, in crowdsourcing information about the environment, providing redundant communications channels, verifying instructions, etc.

Fulfillment of orders may include various operations, such as, but not limited to: assembling orders where various products are purchased and aggregated for delivery to a customer, such as for a grocery chain; assembling products with various subcomponents; conducting various operations on products (such as soldering components together), sorting products, etc.

Orders may also be returned, for example, if an order is cancelled, a delivery fails, etc. In some scenarios, while an order is in the process of fulfillment within the hive, it may be cancelled and the product items may need to be returned. In some scenarios, the items may need to be placed again into containers, and the containers moved to various locations. In some scenarios, a workstation may need to conduct tasks to reject/rework products when an order is returned or cancelled.

Furthermore, as mentioned above, individual containers may be in vertical layers, and their locations in the "hive" may be indicated using co-ordinates in three dimensions to represent the robot or a container's position and a container depth (e.g. container at (X, Y, Z), depth W). In some embodiments, locations in the "hive" may be indicated in two dimensions to represent the robot or a container's position and a container depth (e.g. container at (X, Y), depth Z).

The "hive" itself may be a "dynamic" environment, in the sense that robots and workstation locations may be associated with different parts of the hive for engaging in actions. For example, robots may need to access a specific container in a specific location in the hive dimensions (e.g. container at (X, Y, Z), depth W) to fulfil a particular order or to store a product in the "hive". This involves movements of the robots along various possible paths, for example, along the top of the grid, and then accessing particular containers at selected depths of a stack.

The access of particular containers at selected depths of a stack may necessitate the movement of containers which may otherwise obstruct the ability to access a particular container (e.g. where the containers are stacked, a number of containers must be moved first to be able to access a container that is not at an accessible end of the stack). In some embodiments, it may be advantageous to have the system configured to provide for the evaluation and optimisation of a new position for every container that has to be removed to access a target container.

Containers moved off of a stack need not be moved back to their original stack.

One of the potential advantages is the ability to modify the distribution of containers such that the containers are located in more easily accessible or otherwise more convenient locations.

This may help maintain an optimal distribution of containers within the facility, for example, biasing containers that are expected to be in higher demand in more easily accessible locations, such as locations nearby or within workstations, to reduce travel distance.

FIG. 7 provides a sample perspective view of a warehouse, according to some embodiments of the invention.

Robots may have various shapes, sizes and configurations, and may have various communications means, sensors and tools. In some embodiments, each robot may be able to communicate with the control system through a set of frequency channels established through a set of base stations and base station controllers. Robots may utilize various tools to move and obtain containers from a stack, including, for example, a winch to carry a container.

FIG. 8 provides a sample diagram of a robot with a winch and a container, according to some embodiments of the invention.

The grid is not limited to rectangular grid elements and may be comprised of curved tracks, tracks up and down, etc. The grid pathways may have intersections and may be accessed by more than one robot.

Each grid may be segmented, physically or logically, into one or more sub-grids.

The grid may be comprised of one or more workstations. Workstations may be manual, semi-automated or fully automated, and may consist of locations or areas where operations are conducted within the hive, or operations are conducted in relation to the hive, containers or products, such as, moving products in or out of the hive, manufacturing products, assembling products, processing products to their components, providing staging locations to support other steps or operations, etc.

Workstations could include, for example, locations where items are moved from inbound carriers, locations where products have various operations conducted on them (e.g. assembly of components, painting, sorting, packaging, disassembly, reworking products, fixing packaging, replacing products in cancelled orders, rejecting returned products, disposing products), products are moved to outbound carriers, locations with capabilities for refrigeration, locations where components or objects are assembled, locations used for staging or pre-fetching products, locations where robots are repaired and maintained, locations where robots are charged, locations where workers "pick" products to be placed into containers, locations where workers "pick" products to be removed from containers in fulfillment of orders, bags are placed into containers, etc.

Where items/products are returned to the hive, the system may support and/or control the process of bringing back the product, reworking the product, and/or disposing the product if rejected. The scenario may, in some embodiments, involve processing the returned container (which may be a delivery tote or other object as well) at a workstation to determine whether it can be accepted back into the system, whether it needs reworking/repackaging, and/or whether the product should be disposed of instead (e.g. a perishable product has expired).

Workstations may have one or more workers or robots present to conduct various tasks, such as picking items for fulfillment of orders.

In some embodiments, workstations may also be stations with conveyors, refrigerators, various tooling technologies and/or other technology to manipulate, paint, fasten, repair, freeze, heat, expose to chemicals, refrigerate, filter, assemble, disassemble, sort, package, scan, test, transport, store or process goods, containers, etc.

The workstations may have their own pathways within the facility, share pathways with the facility, etc. The workstations may also have various input and output pathways or other types of entry/egress points within the facility.

In some embodiments, the workstations communicate with one or more warehouse management systems to provide information and data related to the status of the workstation, workflow, required containers, issues, status of products held or otherwise manipulated (e.g. sub-components being assembled together), etc.

Upon receipt of an order from a customer for multiple items stored in a storage and retrieval system, fully or semi-automated container handlers may retrieve storage containers containing relevant items from a grid, racking, or other ordered arrangement of storage containers, and deliver them to one or more workstations.

At the workstations, items may be removed from the storage containers and placed in an intermediate holding facility before being picked into delivery containers.

As indicated throughout this specification, it may be advantageous to have a distribution of containers such that containers that are likely inputs for certain workstations are located close in proximity to those workstations.

The picking of items from containers may be done manually by human pickers, or be conducted in a semi-automated or fully-automated manner with the assistance or participation by various mechanical or robotic elements.

Where individual containers are stacked vertically in layers, accessing a container that is not at the top layer may require a further set of operations to move containers stored at layers above the desired container prior to being able to access the desired container. For example, if a desired container is one level below the top layer, the container residing within the top layer may need to be moved to another location prior to accessing the desired container. As indicated throughout this specification, it may be advantageous to have a distribution of containers such that containers holding items in greater demand are biased towards the more easily accessible positions (e.g. if a vertical stack of containers, the uppermost levels). In some embodiments, an optimisation module provides an optimal location for these containers to be positioned.

In a typical commodities picking operation adapted for handling a large variety of items, such as a grocery order processing system, it is sometimes found that a wide range of items of various sizes, shapes, weights, and other characteristics must be handled or otherwise accommodated, and that these items may need to be moved around a facility to various stations for various operations to be conducted, during the fulfillment of one or more order(s). Depending on the size, organisation and arrangement of the facility, the movement of these items may be advantageously optimised so that items are moved efficiently, collisions are avoided and dependencies are resolved (e.g. objects are picked and unloaded in a proper order).

The various actions involved in these working groups such as placement of items in different types of containers, storage of containers within the hive, and sorting/delivery as described can result in various movements of the containers, including within the hive, but also placement of containers in different locations. These actions may include inbound/outbound activity to the hive (e.g. bringing items to and from a warehouse), and may also include associated sorting/delivery systems such as management of conveying product off vehicles for storing/delivery, and also conveying onto vehicles for order fulfilment.

In other embodiments of the invention, the workstations may be utilized to provide other types of item handling or container handling, such as workstations where actions are performed on items (e.g. assembly, disassembly, modification, sorting, drying, freezing, testing, chemical exposure, physical manipulation, fastening, repair, printing, painting, cutting, packaging, storage, processing, welding, tempering, reprocessing). These workstations may be manual, semi-automated, or automated and have various parameters associated with their operation or performance, such as throughput, required inputs, required outputs, load balancing, required delays (e.g. drying time), etc.

The various movements of the robots, placement of containers/objects, and control over selecting when to remove product from containers may be controlled and optimised by one or more control systems. This control may include the implementation of various strategies, including, for example:

The central management of one or more robots;

Managing the robots not only to retrieve containers for processing, but also to "pre-fetch" containers to more convenient locations, for example, locations close to or within workstations;

Path optimisation through the application of one or more path finding algorithms (e.g. branch and bound techniques);

Path optimisation through the application of one or more heuristic techniques to the one or more path finding algorithms (e.g. projected lowest cost, where in one embodiment of the invention, cost may be calculated as a function of total time to target, and total "accumulated heat" for congestion mitigation on the grid when viewed as a whole);

Scheduling/pre-processing movement pathways in advance;

Conducting simulations to determine optimal depth of analysis in scheduling/pre-processing movement pathways;

Application of machine learning techniques to optimise exponents and coefficients applied to the cost functions of one or more algorithms. In some embodiments, this may include path finding, container placement and workstation load-balancing algorithms;

A just-in-time robot path conflict resolution system;

The subdivision of the robot population into separate control groups each containing one or more robots;

Container location optimisation through various means, such as the application of a scored selection algorithm using weighted cost coefficients;

Optimisation of the allocation of work to workstations;

Pre-processing of tasks and actions to schedule future tasks and actions.

In an example environment where one or more robots are used for the fully or semi-automated retrieval, storage and movement of objects, the warehouse may first have to decide how to distribute the container loads between different robots or groups of robots.

For example, the allocation of tasks across various groups of robots and pick stations may be optimised depending on the particular layout of a warehouse, the placement of items, particular characteristics of goods (e.g. the item is expiring or is potentially dangerous) and the workflow ordering.

For example, it may be desirable to have a system that intelligently compares potential paths for a robot to take to its destination, taking into consideration, among others, the potential congestion along that path, the time required to complete operations, the potential for collisions, the objects held in the inventory of a particular robot, predicted future operations and the characteristics of a particular robot (e.g. battery levels, service issues).

It may further be desirable to have a system that intelligently adapts to various conditions in the "hive", such as idle robots that may hinder or block the path of a robot, obstacles, or other robots reserving paths that a particular robot is seeking to traverse.

It may further be desirable to have a system that intelligently positions containers based on an algorithm to bias the system towards a distribution of containers that aids in the efficient retrieval of items (e.g. containers with items of high-demand SKUs are kept near the top and near their workstations for ease of access).

These are non-limiting examples, and any optimisation methods, arrangements or considerations may be implemented.

Referring to FIG. 2, a schematic diagram is provided of sample fully- and semi-automatic goods storage and retrieval systems, according to some embodiments of the invention. FIG. 2 is provided at a high level, illustrating an example implementation. Various implementations of the system 200 may involve more or less components and FIG. 2 is merely provided as an example.

The system 200 is comprised of a robot control system 202; a maintenance/monitoring system 204; a base station controller 206; one or more base stations 208a and 208b; one or more robots 210a, 210b and 210c, and one or more charger stations 230. While only two base stations 208a and 208b, and three robots 210a, 210b and 210c are illustrated, it should be understood that that there may be more, or less robots and base stations in other embodiments of the system.

There may be one or more warehouse management systems (WMS) 232, order management systems 234 and one or more information management systems 236.

The warehouse management systems 232 may contain information such as items required for an order, SKU #s in the warehouse, expected/predicted orders, items missing on orders, when an order is to be loaded on a transporter, expiry dates on items, what items are in which container, whether items are fragile or big and bulky, etc.

In some embodiments, the warehouse management systems 232 may be in communication with the workstations and may also contain information related to the operation of the workstations, such as the status of the workstation, what products and/or what containers the workstation is required to receive at particular times, what products and/or containers the workstation will be required to have moved to another location at particular times, the expected workflow for operations at the workstation, the number of robots currently waiting to bring containers to a workstation, etc.

The robot control system 202 may be configured to control the navigation/routing of robots, including, but not limited to, moving from one location to another, collision avoidance, optimisation of movement paths, control of activities to be performed, etc. The robot control system 202 may be implemented using one or more servers, each containing one or more processors configured based upon instructions stored upon one or more non-transitory computer-readable storage media. The robot control system 202 may be configured to send control messages to one or more robots, receive one or more updates from one or more robots, and communicate with one or more robots using a real or near-real time protocol. The robot control system 202 may receive information indicating robot location and availability from one or more base stations 208a and 208b. The robot control system 202 may be configured to keep track of the number of robots available, the status of one or more robots, the location of one or more robots and/or their current instruction sets. The robot control system 202 may also be configured to process and/or send control messages to the one or more robots in anticipation of future movements, potentially reducing the processor load, and also proactively managing the traffic load with respect to the communications links. Such an implementation could be advantageous in light of complex algorithms in use by the robot control system 202 in determining optimal pathways, calculating optimal locations for containers and/or determining reservations and/or clearances.

In some embodiments, the servers may utilize a 'cloud computing' type platform for distributed computing. A cloud-based implementation may provide one or more advantages including: openness, flexibility, and extendibility; manageable centrally; reliability; scalability; being optimized for computing resources; having an ability to aggregate information across a number of users; and ability to connect across a number of users and find matching subgroups of interest. While embodiments and implementations of the present invention may be discussed in particular non-limiting examples with respect to use of the cloud to implement aspects of the system platform, a local server, a single remote server, a software as a service platform, or any other computing device may be used instead of the cloud.

In some embodiments, the movement optimisation module may utilize one or more control groups to segregate robots into the one or more groups. The use of control groups for large grids may provide certain advantages, such as the ability to maintain operation of a very large grid whenever real-time computation cannot keep up with re-planning after a control anomaly such as when (i) wireless communication link drops more sequential packets than allowed for in planning; (ii) one or more robots fail; (iii) one or more robots operate outside the pre-determined tolerance on performance.

A control stop message may be broadcasted to the robots in a particular "control group"; potential benefits from broadcasting messages as opposed to sending individual messages may include improved communications through the use of multiple transmission slots and a potentially higher signal to noise ratio.

In some embodiments, the robot control system 202 may be configured to dynamically assign robots to different "control areas" as they move across the grid.

The maintenance/monitoring system (MMS) 204 may be configured to provide monitoring functions, including receiving alerts from one or more robots or one or more base stations, establishing connections to query robots. The MMS 204 may also provide an interface for the configuration of monitoring functions. The MMS 204 may interact with the robot control system 202 to indicate when certain robots should be recalled.

The base station controller 206 may store master routing information to map robots, base stations, and grids. In some embodiments, there may be one base station controller 206 per warehouse, but in other embodiments of the invention, there may be a plurality of base station controllers. The base station controller 206 may be designed to provide high availability. The base station controller may be configured to manage dynamic frequency selection and frequency allocation of the one or more base stations 208a and 208b.

The base stations 208a and 208b may be organised as a pool of base stations, which may then be configured to be active, on standby or to monitor the system. Messages may be routed through a variety of communications means to/from robots. The communications means may be any communications means, in some embodiments, the communications means may be a radio frequency link such as those falling under wireless standard 802.11. The base stations 208a and 208b may further include processing units 212a, 212b, digital signal processors 214a, 214b, and radios 216a, 216b.

The one or more robots 210a, 210b, and 210c may be configured to move around the grid and to perform operations. Operations may include moving a container from one stack to another, going to a charging station to recharge, etc. The one or more robots may be assigned to communicate with the one or more base stations 208a and 208b.

The one or more robots 210a, 210b, and 210c may not all be the same type of robot. There may be different robots with various shapes, designs and purposes, for example, there may be a robot with a footprint of a single grid position which winches containers for internal stowage, a cantilever robot, a bridge robot, a recovery robot, etc.

In some embodiments, the one or more robots 210a, 210b and 210c have winches on them which may be used to retain a container for movement from one position on the grid to another.

The robots 210a, 210b and 210c may have, respectively, radios 218a, 218b, 218c, digital signal processors 220a, 220b, 220c, processors 222a, 222b, 222c, real time controllers 224a, 224b, 224c, batteries 226a, 226b, 226c and motors, sensors, connectors, etc., 228a, 228b, 228c.

The one or more charger stations 230 may be configured to provide power to charge batteries on the one or more robots 210a, 210b and 210c. The one or more charger stations 230 may further be configured to provide high speed, wired data access to the one or more robots, and several charge stations may be placed around the grid for use by the one or more robots 210a, 210b and 210c.

Referring to FIG. 3, a block diagram is provided of the control system 202, according to some embodiments of the invention. The block diagram is provided for illustrative purposes to identify some of the components of control system 202 in more detail, however, not every module or interface identified may be required and, in various embodiments, more or fewer modules may be included.

The control system 202 may be configured to evaluate how to improve work allocations, movements of product and placement of product. According to various embodiments of the invention, optimisations may be run in real time, while others are run, for example, periodically during down time or less active times.

The control system 202 may be configured to schedule when specific types of movements should happen and in what order they should occur, depending on the application of various business rules, indicating priority, etc. The control system 202 is configured to determine both inbound and outbound factors in making decisions even relative to product placement for example. For example, the control system 202 may act on estimated delivery location of product supply, and estimated outbound delivery of product. The control system may make decisions, and may send signals for execution by an automatic system, and/or may allocate tasks efficiently to humans (pickers, loaders etc.).

The control system 202 may determine that one or more robots or one or more pickers should conduct one or more actions in the fulfillment of an order or for any other purpose. The action of the one or more robots may require the robots to traverse the grid, and/or to conduct actions, such as retrieving a container.

The control system 202 may be configured to analyze various pathways in the grid to determine one or more paths that may potentially be preferential relative to other pathways, given a set of constraints and conditions. These preferential pathways may then be provided, one-time, periodically and/or dynamically to the robots to control their movements throughout the grid.

A path may be preferential for a number of reasons, including, but not limited to: less distance travelled, greater expected average velocity of robot, lower probability of encountering traffic (i.e. congestion), less total time required, lower probability of collision, less power used, ease of switching to alternate pathways, ability to avoid obstacles (e.g. a broken robot, a dropped item, a broken path, a part of the path is under repair).

The control system 202 may use various algorithms to identify, design and/or control the movement of various robots it is connected to. In some embodiments, the control system is implemented using one or more servers, each containing one or more processors configured to perform one or more sets of instructions stored upon one or more non-transitory computer readable media. Potential advantages for computer implementation include, but are not limited to, scalability, ability to handle large amounts of processing and computational complexity, increased reaction speed, ability to make decisions quickly, ability to conduct complex statistical analysis, ability to conduct machine learning, among others.

These algorithms are discussed more at depth further in the specification, and sample path-finding algorithms and heuristic approaches are provided, according to some embodiments of the invention.

Constraints may include the current layout of the grid, the physics of the robot (e.g. maximum velocity, turning radius, turning speed, maximum acceleration, maximum deceleration), congestion (e.g. expected traffic load at a certain pathway or intersection), established 'highways', impact of objects being carried by the robot (e.g. big, bulky, or fragile objects), robot status and condition (including battery condition, damage, maintenance issues), and station status (e.g. the destination station is full or temporarily blocked).

The control system 202 may be a real or near-real time control system (controlling the actions of the various units including robots and optionally the associated other units involved such as conveyors, pickers, humans, etc.). The control system 202 may be comprised of one or more modules. The one or more modules may include a control interface 302, a movement optimisation module 304, a product placement optimisation module 306, a robot physics model module 308, a business rules module 310, a clearance module 312, a reservation module 314, a command generation and scheduler module 316, a robot communications module 318, a charge manager module 320 and an alert/notification module 322. These modules may be implemented in various ways, in some embodiments they are implemented as applications stored as instructions on one or more computer-readable media to be performed by one or more processors.

The control system 202 may provide real or near-real time control of the allocation of work, workstation operations, the movement of robots and/or the placement of containers, according to some embodiments of the invention. The allocation of work, movement and placement of containers may be precipitated by actions as relevant to activities within a warehouse, such as the fulfillment of orders, the redistribution of containers to more easily accessible positions, estimated dispatch sequences, maintenance operations, workstation operations, anticipation of future orders, etc.

The control interface 302 provides an interface for various external systems to provide directions and information into the control system 202. The control interface 302 may, in various embodiments, provide interfaces for human users and/or interfaces for interfacing with various machines and systems.

Interfaces for humans may include, for example, keyboards, visual displays, command prompts, etc.

Interfaces for machines and systems may include application programmable interfaces (APIs), implemented using different specifications, including, but not limited to, simple access object protocol (SOAP) and representational state transfer (REST) services, and/or interfaces written in various programming languages. The control interface 302 may interact with various external databases, including but not limited to various warehouse management systems and order management systems; and also may receive information from the various robots (e.g. a robot is malfunctioning, a robot requires charging, a robot is en route to the destination, a robot has encountered an unexpected obstacle, etc.).

The control interface 302 may also receive and transmit information to and from the warehouse management system (WMS) relevant to the control and movement of robots and containers. Such information may include, but is not limited to, grid location and sizing, the establishment of sub-grids, master records of inventory and orders, locations of workstations, parameters related to workstations, and/or also the dispatch sequence (e.g. when orders need to go out). As actions are performed, containers brought to workstations, workstation operations completed, delivery totes filled, etc., the control interface 302 may provide updates to the WMS. In some embodiments, there is a confirmation process between the WMS and the control interface 302. These updates to the WMS may include, for example, updated stock levels related to particular SKU #s, updated container positions, updated object positions within containers, updated facility conditions, etc.

In some embodiments of the system, in addition to the WMS, there may also be a separate order system that contains and provides information regarding various orders entering the system, the fulfillment of orders, workstation operations, upcoming orders and predicted orders.

The control interface 302 may also receive commands to stop the operation of a particular robot, a group of robots or all of the robots (e.g. in the event of a malfunction, an emergency, etc.).

The movement optimisation module 304 may be configured to optimise the movement of robots through applying various algorithms to determine potentially advantageous routes from one location to another. The potential advantages may include shorter distance travelled, lower likelihood of encountering congestion, shorter time required, lower power consumption, co-ordination with movements of other robots, routing around obstacles such as broken robots or broken areas of track, co-ordination with various workstation operations, etc.

The movement optimisation module 304 may be configured to provide work allocation, planning and scheduling functions, including developing a set of tasks and then selecting which pick station or robot should conduct which task. For example, this may be based upon where a robot or a pick station is located, the particular capabilities of the robot or pick station, etc. Further, the particular permutations and set of actions required to fulfill a particular order are determined and actions/tasks are developed for one or more robots and or one or more pick stations. Functions may include, among others, delivering empty containers to inbound stations, placing containers loaded with goods around the warehouse, bringing containers to pick stations or other areas, moving containers from one location in the warehouse to another, etc.

The movement optimisation module 304 may be configured to interact with the product placement optimisation module 306 in determining a set of potentially advantageous locations to place an object. For example, given that a container containing items of a particular SKU # that is required at a high frequency, the product placement optimisation module 306 may indicate that it should be placed at a certain location in a certain stack that is more accessible for retrieval. Conversely, if a container contains items of a particular SKU # that is required at a low frequency, the product may be determined to be placed at a lower depth within a less easily accessible grid location.

In optimizing movement, the movement optimisation module 304 may be configured to consider various factors involved in both movement and the performance of an operation, such as the expected time required to get to a particular location, how deep the container is within a stack, how long it would take to dig a container out of a stack, the various operations necessary to move containers located above to other locations, etc.

The movement optimisation module 304 may also be provided a set of inputs from the robot physics model module 308, which may communicate a set of constraints on the movement of the robot depending on various factors (e.g. the robot may only move at 50% of the maximum velocity as the robot is currently carrying delicate objects). The movement optimisation module 304 may coordinate the movement of boxes into the grid, out of the grid and within the grid.

In some embodiments, the movement optimisation module 304 may dynamically recalculate preferential paths during the course of a robot's journey to potentially determine an updated set of paths as conditions and constraints change over time.

In some embodiments, the grid may be pre-processed by the movement optimisation module 304 to potentially increase processing speed and/or reduce processing load. Other methods of reducing processing load are also contemplated, such as reducing the depth/breadth of searching, dividing the grid into sub-grids, distributed processing, caching future routes, computationally simplifying the grid (e.g. reducing the number of nodes under analysis), reducing path re-calculation, etc.

In some embodiments, the movement optimisation module 304 may divide a grid into a plurality of smaller sub-grids for analysis. Such division may ease demands on processing power, which may be particularly useful if grid sizes are very large; for example, a 1000×1000 grid may be broken into 100 100×100 grids and each grid analyzed separately. This may be further useful if the system is attempting to control a very large number of robots or take into consideration a large number of conditions.

The movement optimisation module 304 may also interact with the clearance module 312 and the reservation module 314 in determining whether the navigation of a proposed pathway will encounter issues involving the clearances and reservations of other robots and also determining pathways that may reduce the chances of encountering these issues.

Where a desired container is located within a stack at various depths within the stack, the movement optimisation module 304 may be required to control one or more robots in the movement of containers off the stack so that the desired container is accessible. The movement optimisation module 304 may coordinate movement across one or more robots such that the one or more robots cooperate in moving containers off the stack.

In some embodiments, the movement optimisation module 304, it may not be necessary or even desired to replace the containers on the stack, rather, containers that have been moved off of the stack may have an optimal position determined by the product placement optimisation module 306, and may be moved there by the one or more robots. A potential advantage of such an embodiment is that increased efficiency may be found when containers are not replaced in their original position but rather placed in a more optimal position.

In some embodiments, the clearance module 312, the reservation module 314 and the movement optimisation module 304 are utilized together as a path conflict resolver, wherein a movement optimisation module 304 develops a path and then reserves the path using the reservation module 314, and the clearance module 312 provides a just-in-time approach to determining priority when robots are engaged in potentially conflicting paths.

In some embodiments, the movement optimisation module 304 is configured to account for situations where a robot is attempting to take a container to a full station. In this situation, the movement optimisation module 304 is configured to instruct the robot to take the container nearby to be held by the robot until the station can accept the container. When the station can accept the container, it is dropped off. In these embodiments, held containers may be dropped off in priority order.

In some embodiments, if a station becomes free for drop off before the held container arrives at its holding location, the movement optimisation module 304 will re-plan to drop off the container directly, without holding.

In some embodiments, the movement optimisation module 304 is further configured for pre-fetching operations, wherein a container is moved closer to a station prior to it being required at the station. Containers are then ready to be dropped off when required, which may reduce the uncertainty of the drop off time.

In some embodiments, the system may be configured to plan the robot paths and establish robot path reservations sufficiently far in the future to allow the algorithms to complete.

In some embodiments, the degree of forward planning required may be computed by simulation.

The simulations may be used to adjudicate (in a statistical sense) between the efficiency gains of planning far into the future; against the efficiency loss of having higher probabilities of having to re-plan when robots fail to maintain their plan, because of various reasons, such as short-term communication packet losses, and/or robots running outside the allowed tolerances.

The product placement optimisation module 306 may be configured to determine a set of potentially advantageous locations to place a particular container containing particular items. The product placement optimisation module 306 may utilize relevant information, such as the layout of the grid, the frequency at which a particular item is requested, future ordering, predicted future ordering, the location of workstations, the location of charging stations, and the congestion level of particular areas and branches of the path, among others, in determining the set of potentially advantageous locations to place a particular container containing particular items.

A robot may be tasked with transporting one or more containers, each of which may contain one of more items, to satisfy the demands of one or more service pick stations. Each container may be provided with an index number related to a stack location so that particular containers may be biased towards particular stack locations.

The distribution of and positioning of a container within a stack or relative to the layout of a grid may contribute towards the overall operational efficiency of a warehouse.

There are various situations where a container needs to be placed somewhere in the facility and these situations present an opportunity to re-evaluate and/or optimise the distribution of the position of containers in the facility.

There are various considerations that would indicate that a position is better or worse than another position, which may include, but are not limited to, distance to workstations, level of congestion in the area, which containers will be blocked by a particular container, logical groupings of containers relative to environmental factors (e.g. containers containing flammable objects may require special positioning), intelligent pre-fetching to a location by a work station.

These considerations may be utilized by the system to compare one position with another, for example, by using a weighted algorithm or any other suitable method.

For example, when a new container is introduced into the facility, when a container is returned to the facility, when one or more containers are moved by robots attempting to access the items stored deep within a stack, when items are placed in/removed from the container, when a container is marked damaged, when a container is marked as dirty, etc.

This optimisation can be conducted at various times, for example, in some embodiments, the optimisation is conducted to determine a new position for every container that has to be moved, such as those that have to be removed so that a particular container below can be accessed.

For example, the number of robot movements and operations may be potentially reduced if frequently ordered items and only a certain number of items for each given SKU # are distributed in the easiest to access areas of the warehouse (e.g. the closest locations to each pick station and/or the tops of stacks of containers).

An "active window" is defined as the number of orders' worth of containers to keep in the active state (on hand to service workstations) and determined by the system. The product placement optimisation module 306 may be configured to assign scores to containers, biasing the overall hive layout to tend towards a top layer of active containers, with reserve stock underneath.

This scoring system may be determined by the business rules module 310, and set based upon information such as the stock expiry date. Historical orders may be utilized, among other information, to factor into calculating a score for containers, and this score may be updated on a continual basis every time the stock level of a SKU # changes. This scoring system may be utilized to help bias the positions of containers to maintain the optimality of positioning of containers within the facility.

In some embodiments, the system may be configured to control robot movement to maintain an "active" pool of one or more containers per SKU # to satisfy the demands of one or more service workstations. As an "active" pool becomes depleted, "reserve" containers may be promoted into the "active" pool.

In some embodiments of the system, the system may be configured to control robot movement using a "put-away algorithm" to determine a "best match" stack location from an available pool of empty locations when placing a container.

In some embodiments, the "active" pool may be configured to support parallel demand from the one or more service workstations.

In some embodiments, the product placement optimisation module 306 may also balance orders between the pick stations.

The robot physics model module 308 may be configured to store a set of variables that are designed to model the particular physical properties relevant to a robot. For example, the model may indicate physical characteristics such as the length, weight, height and width of a robot, the maximum carrying capacity of a robot, the rotational speed of the robot, the winch cycle time of a robot, the maximum velocity and acceleration of a robot, the ability for a robot to perform certain actions given a set amount of battery life, etc. The robot physics module 308 may interface with the business rules module 310 in determining limits on certain characteristics of robot movement, including the maximum velocity, maximum acceleration, and maximum rotational speed of a robot. For example, a robot carrying a number of cartons of eggs may be required to only accelerate/decelerate at 25% of the maximum acceleration/deceleration of the robot due to the vulnerability and fragility of the eggs due to physical forces.

The business rules module 310 develops and applies a set of business rules based upon the particular circumstances of the warehouse, robots and communications systems. For example, the business rules module 310 may provide that for certain classes of items, various restrictions are in force for the robot physics model module 308 to potentially reduce the amount of damage incurred by goods in transit. Examples of where business rules may be implemented include high risk products (e.g. acid, bleach etc.), containers with aerosols, and containers with flammable contents, among others. Empty containers may also be treated differently to other containers.

The business rules may include actions such as cleaning a container prior to re-use, slowing down robots containing certain objects, etc.

The business rules module 310 may also be configured to develop and apply sets of rules governing the placement of products. For example, different rules may be in place for high-frequency items, items that may be picked soon due to incoming orders, etc.

The clearance module 312 may be configured to store and provide clearances for various robots. A system of clearances may be accessed to determine whether a path is clear for a robot to traverse. The clearance module 312 may be implemented as a passive collision avoidance system, wherein robots are only given the smallest amount of work possible without impacting performance.

Upon providing a robot with a new instruction, the clearance module 312 checks that it will not be possible to collide with another robot, based upon, for example, grid dimensions, grid positions, move commands generated by planning, cancellation of move commands (generated on events such as a controlled stop), the current positions and speeds of robots, braking ability of robots as well as where they have been cleared to visit.

The clearance module 312 may be configured to issue clearance "just in time", and may be used to grant permissions to robots to continue along their planned paths. A new clearance may be generated (or withheld) in response to each robot status report. As such, the clearance module 312 may act as a path conflict resolver. Where clearances are required, the clearance module 312 may interact with the movement optimisation module 304 to dynamically re-plan routes to resolve or avoid conflicts.

The clearance module 312 may provide to the control interface 302 what the clearances for a path would be, notification of when a clearance is issued (e.g. to the planning system as this may allow dynamic re-planning from the end of the current clearance), notification of when a clearance is withheld (e.g. to identify error cases, and to identify needs to re-plan), and to an alerting system (because there is a potential problem with a robot, robot communications, or the control system 202).

The clearance module 312 may be configured to devise clearance schemes based upon a set of tolerances, including missed messages, processing time, clock sync and robot discrepancies with the physics model, among others.

The clearance module 312 may provide a set of safe entry times for one or many position on the grid, based upon robot position and speed updates, and clearances given/withheld. The set of safe entry times may be dynamically updated as the conditions of the grid change.

The clearance module 312, in some embodiments, may be configured such that robots are only provided clearances for a predetermined period of time (e.g. 3 seconds). The clearance given to a robot may be configured such that the period of time is sufficient for the robot to come to rest without risking a collision.

In some embodiments, the clearance module 312 may be configured such that clearances are provided such that the control system 202 may be able to miss a configurable number of status messages from the robot, and still have the robot continue operation for a short period of time. This design may result in a system that may be more tolerant to missed packets, which may be advantageous in having continued operation even where some issues with communications are encountered. The configurable number may be set such that there is a high probability that the control system 202 is likely to receive a status message from the robot before the robot autonomously decelerates to be at rest at the end of its clearance.

In some embodiments, if a robot has begun to decelerate, it will be allowed to come to rest and the control system 202 may then cancel its onward reservations and re-plans its path over the grid.

The reservation module 314 reserves various paths on the grid (e.g. robot A is planning to take path X and reserves path X during the expected traversal time. Robot B, knowing that robot A has reserved path X, chooses path Y instead). The reservation module 314 may be designed to create non-conflicting robot movement plans, and may be configured to work in conjunction with the clearance module 312 and the movement optimisation module 304.

The reservation module 314 may be configured to provide reservations for a robot for a grid location for a span of time, where no two robots may be given overlapping reservations, taking into account tolerances for robots being marginally off plan, tolerances for lost robot communication messages, and tolerances for clock discrepancies, among others.

In some embodiments, the reservation module 314 is used to reserve routes in advance and to make sure that robots do not plan to take conflicting paths, especially where there are a large number of robot actions and tasks taking place simultaneously. The reservation module 314 may be configured to allow sufficient tolerance for any robot to stop under controlled braking without risking a collision.

The reservation module 314 may be configured to interact with the movement optimisation module 304 to establish the robot path reservations sufficiently far in the future to enable forward planning. In some embodiments, the reservation module 314 and the movement optimisation module 304 allow sufficient forward planning to complete the computation of the movement algorithms.

The command generation and scheduler module 316 generates a set of instructions to be transmitted to the one or more robots. These instructions may include, for example, that robot A is required to move to location B to obtain container C, bring container C to a workstation and then return container C to a particular location D. These instructions may be transmitted in a near-real time/real-time configuration, in a just-in-time configuration, and/or provided ahead of time to allow for planned/scheduled routes. Further, in some embodiments, the command generation and scheduler module 316 coordinates the reservations and clearances to help a robot expeditiously navigate its way across a facility.

The command generation and scheduler module 316 may be configured to provide a command set comprising a single path, or one or more paths, and/or a number of operations to be performed at various locations. The command generation and scheduler module 316 provides these commands to the robot communications module 318 to be provided to the individual robots. In some embodiments, the command generation and scheduler module 316 pre-populates instructions for a particular robot—these instructions may then be provided to the robot through the robot communications module 318 to be executed at a future time.

The robot communications module 318 may be configured to transmit information back and forth from the robots via the one or more base stations and the base station controller 206. In some embodiments, the robot communications module 318 may communicate through the use of wireless signals. As indicated above, these instruction sets are not necessarily just-in-time, instruction sets may be sent for the coordination of future movements.

The robot communications module 318 may receive status reports from various robots. The robot communications module 318 may be implemented in various ways, such as utilizing synchronous, asynchronous, polling, push or pull methodologies. Further, various implementations may or may not include the use of communications "handshaking".

In some embodiments where there is no "handshaking", the communication systems may not guarantee message delivery, and lost packets may ensue. Potential advantages to such a system may include decreased bandwidth requirements and the submission of instructions on a best efforts basis. Various schemes may be implemented to minimize the impact of lost packets, such as timed rebroadcasting of instruction packets, sending overlapping instruction packets that contain parity information or other validation schemes, or other flow control and retransmission schemes.

In other embodiments of the invention, "handshaking" may be used to ensure that packets are received.

Commands to the robots may be issued ahead of the start time for an operation to be performed by a robot, and this time between the start time and the issuance of a command may be a configurable parameter.

In some embodiments, commands are repeated to the robots to ensure delivery, and the robots may provide acknowledgements that commands were received.

Where a message is not received before a scheduled start time, the robot may be configured to ignore the command and may return a status message indicating that the command was received too late. In this case, the robot control system 202 may be configured to cancel the existing reservations for the robot; and re-plan the tasking for the robot.

In some embodiments, the robot returns a regular status message that acknowledges the last command received (for example, by a command sequence number). The robot control system 202, in some embodiments, may be configured such that no new command can be issued to a particular robot until the last command issued is acknowledged by the robot. If the command is not acknowledged by the robot after a particular period (e.g. a configurable a time-out period); the robot control system 202 may be configured to cancel the existing reservations for the robot. When (command) communication is re-established with the robot; the robot control system 202 re-plans the operation for the robot.

On receipt of each robot status message, the robot control system 202 may be configured to extend a robot's current movement clearance through the clearance module 312.

The charge manager module 320 may be configured to develop a movement plan to recharge robots. The charge manager module 320 may be configured to estimate when robots will have a specified minimum charge, and ensure that all robots are able to charge at or before that point.

The alert/notification module 322 may be configured to provide an alert or notification to the control interface 302 when a potential issue has arisen, or based upon a pre-determined business rule, e.g. a predetermined number of clearances have been withheld due to conflicts.

The present system and method may be practiced in various embodiments. A suitably configured computer device, and associated communications networks, devices, software and firmware may provide a platform for enabling one or more embodiments as described above. By way of example, FIG. 1 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. The computer device 100 may further include a graphics processing unit (GPU) 122 which is operatively connected to the CPU 102 and to memory 106 to offload intensive image processing calculations from the CPU 102 and run these calculations in parallel with the CPU 102. An operator 107 may interact with the computer device 100 using a video display 108 connected by a video interface 105, and various input/output devices such as a keyboard 115, mouse 112, and disk drive or solid state drive 114 connected by an I/O interface 109. In a known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 135 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In cases of more than one computer device performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage partitions of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS™ platform, ANDROID™, WINDOWS™ or BLACKBERRY™.

It will be appreciated by those skilled in the art that other variations of the embodiments described herein may also be practiced without departing from the scope of the invention. Other modifications are therefore possible.

A number of different algorithms and techniques may be used in determining a preferential path for a robot to take, including, but not limited to: branch and bound algorithms, constraint programming, local search, heuristics, graph-traversal, dynamic path learning advisor techniques, pruning techniques and Bayesian graph searching techniques, Dijikstra's algorithm, Bellman-Ford algorithm, Floyd-Warshall algorithm, Johnson's algorithm, breadth-first recursive searches and depth-first recursive searches, weighted paths, A* search algorithm, variants on A* search algorithm (e.g. D*, Field D*, IDA*, Fringe, Fringe Saving A*, Generalized Adaptive A*, Lifelong Planning A*, Simplified Memory Bounded A*, Jump Point Search, Theta*).

In the sections below, sample search algorithms and heuristics are provided, according to some embodiments of the invention.

Sample Search Algorithm

In this section, a sample, simplified algorithm is provided, according to some embodiments of the invention.

For illustrative purposes, the algorithm is provided graphically as a workflow under FIG. 4, according to some embodiments of the invention. It is to be understood that this sample algorithm is a non-limiting example that is solely provided as illustration to the concepts as described above.

The algorithm may be an iterative search algorithm that may utilize a branch & bound search and may apply a "near-best-first" heuristic model including a 'heat map' for congestion avoidance. Branches may be selected using a weighted cost function, and the algorithm may be loosely coupled to grid/robot shape/size.

In some embodiments, branches may be held in a sorted collection.

According to an embodiment of the algorithm, the following recursive branch and bound function is applied:
On each iteration:
(a) Select lowest cost branch b,
(b) Branch b in all directions to create new branches B
(c) For each branch b' in B:
    If b' has reached target:
        return b'
    Else:
        Add b' to search
        Cost comparator allows tracking of lowest cost branch for next iteration In performing a path search, various heuristics may be applied to reduce the computations required, by, depending on the heuristic applied, removing entire branches or conducting a less computationally intensive analysis. Sample heuristic techniques are provided in a later section of this specification.

Where a new branch has a conflict with a path that another robot may be taking, or conflicts with an idle robot, the search algorithm may:
Alter the branch to outrun the conflicting reservation (if acceleration profile allows);
Alter the branch to contain a wait at any position along its path; or
Discard the branch as infeasible In some embodiments, paths may be selected where robots wait at their starting points.

In doing so, the search space can never truly be exhausted (e.g. if there are currently no acceptable paths for a robot to take to its destination, a path may be selected where the robot waits until a non-conflicting path is available).

Sample Heuristic Techniques

The search algorithm may be configured to preferentially balance any number of goals such as taking the shortest possible time, tending to avoid congested areas etc.

The following provides a simple, non-limiting example of the application of the use of heuristics for illustrative purposes.

In an embodiment of the invention, each search may track the current lowest cost branch and weighted cost functions may be used to bias the selection ordering of the branches based upon various heuristics, which may include: (a) a projected shortest path time and (b) a projected accumulated heat based on a heat-map. Other heuristic techniques may be contemplated but for illustrative purposes, further detail will be provided for the two identified above.

(a) Projected Shortest Path Time

For any branch, the control system may determine the shortest possible path time from the current branch tip to the destination.

The projected time cost may then be determined as the total time for the branch so far (including, for example, any waiting that was required, etc.) added to the time for the shortest possible unconstrained path to the target.

(b) Projected Minimum Heat (Based on a Heat Map)

In developing a heat-map, a 'heat' value may be assigned to each coordinate, approximating a model of congestion at points on the grid, or for particular areas of the grid.

FIG. 5 provides a sample heat map, according to some embodiments of the invention.

In some embodiments, the 'heat' value may be determined using proximity to workstations, but in other embodiments of the invention, the 'heat' may be observed/learned/calculated/predicted using a variety of other techniques, some of which may be dynamic or iterative techniques.

Similar to the projected shortest path, an unconstrained path may be projected to the destination.

The projected minimum heat may then be determined. In some embodiments, the projected heat cost is the sum of the heat of all visited coordinates in the current branch added to the heat of the 'coldest' (the least hot) of the projected paths.

Sample Weighted Cost Function

In some embodiments, the algorithms used are based upon weighted cost functions. Such algorithms may be amenable to optimisation of the associated cost coefficients by studying the results of large numbers of concurrent simulations in the cloud configured to use different coefficients, and/or applying various machine learning approaches and techniques, possibly using large sets of observed and/or simulated data.

In some embodiments, the search algorithm has two cost coefficients: (a) the projected shortest path time coefficient ($C_t$), and (b), the projected minimum heat coefficient ($C_h$).

In some embodiments, the search algorithm may include the following equation:

$$\text{Branch cost} = C_t * \text{PSP} + C_h * \text{PMH}$$

(Where PSP refers to projected shortest path time and PMH refers to projected minimum heat)

In some embodiments, the cost function may be utilized with configurable or machine-learning derived exponents that model complex relationships. A sample, simplified cost function, provided for illustrative purposes includes:

$$\text{Branch cost} = C_t * \text{PSP}^x + C_h * \text{PMH}^y,$$

where x & y may be further configurable and/or machine learned exponents.

FIG. 6a provides a table demonstrating how a search branch's projected cost could change as a result of using different coefficients in the path search algorithm. These coefficients could be derived using refinement by a machine learning technique according to some embodiments of the invention.

FIG. 6b illustrates how the use of different cost coefficients demonstrated in FIG. 6a changes which branch will be selected by the next iteration of the search algorithm.

In some embodiments, the control system 202 may be further configured to develop, adapt and apply a set of rules over time to refine a set of machine learned coefficients and/or exponents. The use of machine learned coefficients and/or exponents may potentially increase the effectiveness of the heuristic techniques over a duration of time.

Sample Shunting Search

The system may be configured to adjust robot paths to take into account the positions of idle robots. In some embodiments, there may be idle robots which may be tracked independently of robots with tasks. These idle robots may not have planned paths and associated reservations and may need to be considered separately.

A separate "shunt search" may be performed when a task is being finalised. The "shunt search" may be comprised of finding paths to move robots which are idle now, or will go idle in the path of the robot which is being tasked (hereinafter referred to as the primary robot), to locations where they may continue being idle and not be in the way of the path of the primary robot.

This "shunt search", in some embodiments, comprises performing a search where, for each robot which is idle now, or will go idle in the path of a primary robot, a search is performed which may be deemed solved upon finding a location in which it can remain indefinitely.

The "shunt search" may use the same branch & bound search algorithm as the primary robot path search, but may have different cost coefficients and solution criteria. If a robot is unable to move out of the way in time, a wait may be added to the start of the primary robot's path and the primary robot's path may be recalculated.

Sample Put-away Algorithm

An algorithm may be used to determine a stack location for a container to be returned to. Containers may be returned for various reasons, and the location in which a container is returned to may be optimised for various advantages, such as improving the distribution of objects/containers in the hive.

Every stack location in the hive may be scored with a configurable, weighted cost function of:

Average distance (measured in robot operation time) from all workstations;

Distance (measured in robot operation time) from closest workstation; and

Approximate dig cost (if depth >0)

The system may keep a "Hive Plan" of the current end state of the hive after all operations in the plan have been executed.

The "Hive Plan" may also track the "available surface" in which a robot can place a container. Each container has an index of its position in the totally ordered set of containers, as defined by the product placement optimisation module 306.

Each stack location has an equivalent index in the totally ordered set of stack locations as defined by the weighted cost function.

These indices are remapped to the range 0-1 by dividing by the size of their respective sets, and the stack locations in the available surface are ranked by how closely their indices match that of the container's index.

The final selection is made via a weighted cost function of the difference between these indices and other factors such as how long the ideal path is from the source to the stack location and how long the stack is reserved for in the current plan.

Other business rules can be enforced at this stage, such as limiting the total weight of a stack; controlling the position of hazardous or special substances (e.g. aerosols and inflammable materials) etc.

Sample Return Scenario

The following provides a sample returns process that may be supported/controlled by the system. This process could be applied where an order is scratched, totes did not leave the hive, an order is returned by customer, or a delivery failed to a customer. Other situations may also be contemplated. A returned product (which may be in a container, other holding device such as a tote, etc.) can be processed at a workstation that provides reworking or rejection of the products.

The container/tote may be scanned so that the controller can position the storage bins it expects to need close to the workstation. Supply bins may be selected based on SKU and expiry date. Product items may be removed by the picker one-by-one and scanned. When the container arrives at the workstation, a picker (automated or manual) may be instructed/controlled to place the item into the container.

The picker may also be asked to confirm there are no further eaches of this SKU # left, before the container is released.

Products that are no longer suitable for return to stock may be picked into containers; which, at various times, such as when full, or at the end of the day, may be removed at the workstation and the contents sent to another area, such as the staff shop or disposal as appropriate.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

The invention claimed is:

1. A system for controlling movement of at least one transporting device arranged to transport at least one container, the system comprising:
   one or more processors configured to:
      determine a plurality of paths for a plurality of transporting devices to travel on pathways of a facility, the plurality of paths comprising a first path for travel by a first transporting device of the plurality of transporting devices and a second path for travel by a second transporting device of the plurality of transporting devices,
   wherein the pathways form a grid-like structure above a plurality of containers arranged within the facility, the pathways comprising a first set of parallel rails extending in a first direction and a second set of parallel rails extending in a second direction transverse to the first direction in a substantially horizontal plane, at least some of the plurality of containers being stored in stacks,
   wherein the plurality of transporting devices are configured to selectively move laterally in the first direction and the second direction on the pathways, at least some of the plurality of transporting devices being configured to transport the plurality of containers, and
      generate a plurality of commands for the plurality of transporting devices to cause the plurality of transporting devices to travel on the pathways along the plurality of paths; and
   a memory device configured to store the plurality of commands,
   wherein the one or more processors are configured to determine the first path from an expected level of transporting device congestion as the first transporting device travels along the first path.

2. The system of claim 1, wherein the expected level of transporting device congestion comprises an expected level of transporting device congestion at an area adjacent to the first path.

3. The system of claim 1, wherein the expected level of transporting device congestion comprises an expected level of transporting device congestion along a portion of the first path.

4. The system of claim 1, wherein the expected level of transporting device congestion comprises an expected level of transporting device congestion at an intersection of the pathways on the first path.

5. The system of claim 1, wherein the one or more processors are configured to determine the first path further from a condition of a battery of the first transporting device.

6. The system of claim 1, wherein the one or more processors are configured to determine the first path further from an estimated time for the first transporting device to complete an operation with one of the plurality of containers.

7. The system of claim 1, wherein the one or more processors are configured to determine the first path further from an estimated time for the first transporting device to arrive at a location on the pathways.

8. The system of claim 1, wherein the one or more processors are configured to determine the first path further from an estimated time to dig one of the plurality of containers from the facility for transportation by the first transporting device.

9. The system of claim 1, wherein the one or more processors are configured to determine the first path further from a characteristic of an item that is held in the first transporting device.

10. The system of claim 1, wherein the one or more processors are configured to determine the first path further from a potential for collision between the first transporting device and the plurality of transporting devices other than the first transporting device.

11. The system of claim 1, wherein the one or more processors are configured to determine the first path further from a maximum speed of the first transporting device.

12. The system of claim 1, wherein the one or more processors are configured to:
   determine an order in which the plurality of transporting devices should transport a set of the plurality of containers to a station,
   instruct the plurality of transporting devices to transport the set of the plurality of containers to the station so that the set of the plurality of containers arrive at the station in the order, and
   determine the first path further from a determination that the station is in use by one of the plurality of transporting devices other than the first transporting device.

13. The system of claim 1, wherein the one or more processors are configured to:
   determine the plurality of paths using an optimization algorithm, instruct the plurality of transporting devices to perform a plurality of operations with the plurality of containers at ending points of the plurality of paths, determine the plurality of paths so that no two of the plurality of transporting devices have locations while traveling along the plurality of paths that would cause the plurality of transporting devices to overlap at the same time, determine the plurality of paths so that all of the plurality of transporting devices may simultaneously travel on the pathways, and control operations of the plurality of transporting devices in real time.

14. The system of claim 1, further comprising a control interface configured to communicate with the plurality of transporting devices via an application programmable interface, the one or more processors being configured to cause the control interface to transmit the plurality of commands via the application programmable interface.

15. The system of claim 1, wherein the one or more processors are configured to determine the first path further from a capability of the first transporting device.

16. The system of claim 15, wherein the capability of the first transporting device depends on whether the first transporting device is a first robot type or a second robot type different from the first robot type.

17. The system of claim 15, wherein the capability of the first transporting device comprises a weight carrying capacity of the first transporting device.

18. The system of claim 15, wherein the capability of the first transporting device comprises an availability of the first transporting device to a perform an operation with one of the plurality of containers.

19. The system of claim 15, wherein the capability of the first transporting device depends on a physical structure of the first transporting device.

20. The system of claim 19, wherein the physical structure comprises a footprint of the first transporting device on the pathways.

21. A method for controlling movement of at least one transporting device arranged to transport at least one container, the method comprising:

determining, by one or more processors, a plurality of paths for a plurality of transporting devices to travel on pathways of a facility, the plurality of paths comprising a first path for travel by a first transporting device of the plurality of transporting devices and a second path for travel by a second transporting device of the plurality of transporting devices, wherein the pathways form a grid-like structure above a plurality of containers arranged within the facility, the pathways comprising a first set of parallel rails extending in a first direction and a second set of parallel rails extending in a second direction transverse to the first direction in a substantially horizontal plane, at least some of the plurality of containers being stored in stacks, wherein the plurality of transporting devices are configured to selectively move laterally in the first direction and the second direction on the pathways, at least some of the plurality of transporting devices being configured to transport the plurality of containers;

generating, by the one or more processors, a plurality of commands for the plurality of transporting devices to cause the plurality of transporting devices to travel on the pathways along the plurality of paths; and storing, by a memory device, the plurality of commands, wherein said determining the first path comprises determining the first path from an expected level of transporting device congestion as the first transporting device travels along the first path.

22. The method of claim 21, wherein said determining the first path comprises determining the first path further from a capability of the first transporting device and a condition of a battery of the first transporting device.

23. Non-transitory physical computer storage comprising computer-executable instructions stored thereon that, when executed by one or more processors, are configured to implement a process comprising:

determining a plurality of paths for a plurality of transporting devices to travel on pathways of a facility, the plurality of paths comprising a first path for travel by a first transporting device of the plurality of transporting devices and a second path for travel by a second transporting device of the plurality of transporting devices, wherein the pathways form a grid-like structure above a plurality of containers arranged within the facility, the pathways comprising a first set of parallel rails extending in a first direction and a second set of parallel rails extending in a second direction transverse to the first direction in a substantially horizontal plane, at least some of the plurality of containers being stored in stacks, wherein the plurality of transporting devices are configured to selectively move laterally in the first direction and the second direction on the pathways, at least some of the plurality of transporting devices being configured to transport the plurality of containers; and generating a plurality of commands for the plurality of transporting devices to cause the plurality of transporting devices to travel on the pathways along the plurality of paths, wherein said determining the first path comprises determining the first path from an expected level of transporting device congestion as the first transporting device travels along the first path.

* * * * *